(12) United States Patent
Chang et al.

(10) Patent No.: US 12,262,323 B2
(45) Date of Patent: Mar. 25, 2025

(54) METHOD AND APPARATUS FOR CONTROLLING TIMER

(71) Applicant: Huawei Technologies Co., Ltd., Shenzhen (CN)

(72) Inventors: Junren Chang, Beijing (CN); Ning Dong, Beijing (CN); Zhenzhen Cao, Beijing (CN); Baokun Shan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/062,323

(22) Filed: Oct. 2, 2020

(65) Prior Publication Data
US 2021/0022080 A1 Jan. 21, 2021

Related U.S. Application Data

(63) Continuation of application No. PCT/CN2019/081150, filed on Apr. 2, 2019.

(30) Foreign Application Priority Data

Apr. 4, 2018 (CN) .......................... 201810300184.1

(51) Int. Cl.
*H04W 52/02* (2009.01)
*H04W 72/0453* (2023.01)
(Continued)

(52) U.S. Cl.
CPC ... *H04W 52/0235* (2013.01); *H04W 52/0216* (2013.01); *H04W 72/0453* (2013.01);
(Continued)

(58) Field of Classification Search
CPC ......... H04W 52/0235; H04W 52/0216; H04W 72/042; H04W 72/0453; H04W 76/27;
(Continued)

(56) References Cited

U.S. PATENT DOCUMENTS

2015/0207599 A1 7/2015 Kim et al.
2019/0149380 A1* 5/2019 Babaei .............. H04W 72/1268
370/330

(Continued)

FOREIGN PATENT DOCUMENTS

CN 101102298 A 1/2008
CN 104796245 A 7/2015
(Continued)

OTHER PUBLICATIONS

Intel Corporation, "C-DRX enhancement in NR," 3GPP TSG RAN WG2 Meeting #99bis, Prague, Czech Republic, R2-1710607, total 4 pages, 3rd Generation Partnership Project, Valbonne, France (Oct. 9-13, 2017).
(Continued)

*Primary Examiner* — Michael K Phillips
(74) *Attorney, Agent, or Firm* — Leydig, Voit & Mayer, Ltd.

(57) ABSTRACT

A method and an apparatus for controlling a timer are disclosed. In the method, after user equipment activates a first bandwidth part in response to a first message, the user equipment controls a target timer to perform timing based on a unit time length of a second bandwidth part to optimize the timer in a BWP scenario.

15 Claims, 10 Drawing Sheets

(51) Int. Cl.
*H04W 72/23* (2023.01)
*H04W 76/27* (2018.01)
*H04W 76/28* (2018.01)
*H04W 76/38* (2018.01)

(52) U.S. Cl.
CPC ........... *H04W 72/23* (2023.01); *H04W 76/27* (2018.02); *H04W 76/28* (2018.02); *H04W 76/38* (2018.02)

(58) Field of Classification Search
CPC . H04W 76/28; H04W 76/38; H04W 52/0229; H04W 52/028; H04W 52/0248; H04W 72/1278; H04L 5/0055; H04L 5/0007; H04L 5/0078; H04L 5/0098; H04L 1/1851; H04L 1/1812; H04L 1/1883; Y02D 30/70
See application file for complete search history.

(56) References Cited

U.S. PATENT DOCUMENTS

| | | | | |
|---|---|---|---|---|
| 2019/0158229 | A1* | 5/2019 | Wei | H04W 76/28 |
| 2019/0208548 | A1* | 7/2019 | Shih | H04W 74/004 |
| 2019/0215897 | A1* | 7/2019 | Babaei | H04W 76/38 |
| 2019/0289513 | A1* | 9/2019 | Jeon | H04W 72/0453 |
| 2020/0229089 | A1* | 7/2020 | Tang | H04W 72/0453 |
| 2020/0245360 | A1* | 7/2020 | Xu | H04W 72/21 |
| 2020/0280337 | A1* | 9/2020 | Yi | H04L 5/001 |
| 2020/0288494 | A1* | 9/2020 | Heo | H04W 72/1278 |
| 2020/0403763 | A1* | 12/2020 | Takeda | H04W 72/1284 |
| 2021/0126762 | A1* | 4/2021 | Suzuki | H04W 76/27 |
| 2021/0126763 | A1* | 4/2021 | Zhou | H04W 74/0841 |
| 2021/0167930 | A1* | 6/2021 | Jeon | H04L 27/2607 |
| 2021/0328726 | A1* | 10/2021 | Wei | H04W 72/0446 |
| 2022/0361285 | A1* | 11/2022 | Wei | H04W 72/23 |

FOREIGN PATENT DOCUMENTS

| | | |
|---|---|---|
| CN | 105992318 A | 10/2016 |
| CN | 107078890 A | 8/2017 |
| CN | 107257564 A | 10/2017 |
| CN | 107493605 A | 12/2017 |
| CN | 107872891 A | 4/2018 |

OTHER PUBLICATIONS

"Remaining details for bandwidth part operation," 3GPP TSG RAN WG1 NR AH#3, R1-1715648, Nagoya, Japan, Total 3 pages, 3rd Generation Partnership Project, Valbonne, France (Sep. 18-21, 2017).

"Remaining Details on Bandwidth Part Operation in NR," 3GPP TSG RAN WG1 Meeting NR#3, R1-1716202, Nagoya, Japan, Total 9 pages, 3rd Generation Partnership Project, Valbonne, France (Sep. 18-21, 2017).

"Remaining Issues on BWP," 3GPP TSG RAN WG1 Meeting AH 1801, R1-1800879, Vancouver, Canada, pp. 1-13, 3rd Generation Partnership Project, Valbonne, France (Jan. 22-26, 2018).

"3rd Generation Partnership Project; Technical Specification Group Radio Access Network; NR; Medium Access Control (MAC) protocol specification (Release 15)," 3GPP TS 38.321 V15.1.0, pp. 1-67, 3rd Generation Partnership Project, Valbonne, France (Mar. 2018).

"3rd Generation Partnership Project; Technical Specification Group Radio Access Network; NR; Radio Resource Control (RRC) protocol specification (Release 15)," 3GPP TS 38.331 V15.1.0, pp. 1-268, 3rd Generation Partnership Project, Valbonne, France (Mar. 2018).

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.1.0, pp. 1-109, 3rd Generation Partnership Project, Valbonne, France (Mar. 2018).

"RLM/RLF for bandwidth part," 3GPP TSG-RAN WG2 #99bis, R2-1711404, Prague, Czech, Total 3 pages, 3rd Generation Partnership Project, Valbonne, France (Oct. 9-13, 2017).

"Discussion on HARQ RTT Timer," 3GPP TSG-RAN WG2 Meeting #99bis, R2-1710972, Prague, Czech Republic, Total 4 pages, 3rd Generation Partnership Project, Valbonne, France (Oct. 9-13, 2017).

* cited by examiner

METHOD AND APPARATUS FOR CONTROLLING TIMER

CROSS-REFERENCE TO RELATED APPLICATIONS

This application is a continuation of International Application No. PCT/CN2019/081150, filed on Apr. 2, 2019, which claims priority to Chinese Patent Application No. 201810300184.1, filed on Apr. 4, 2018. The disclosures of the aforementioned applications are hereby incorporated by reference in their entireties.

TECHNICAL FIELD

Embodiments of this application relate to the field of wireless communications technologies, and in particular, to a method and an apparatus for controlling a timer.

BACKGROUND

In the field of mobile communications, discontinuous reception (DRX) for user equipment (UE) means that if the UE does not obtain, through monitoring, scheduling information on a physical downlink control channel (PDCCH) in a period of time, the UE may enter a sleep mode. The UE in the sleep mode does not monitor the PDCCH channel. When monitoring is required, the UE wakes up from the sleep mode. In this way, power consumption of the UE can be reduced. Before entering the sleep mode, the UE needs to determine that timers such as a DRX-retransmission timer and a DRX HARQ RTT (DRX hybrid automatic repeat request-round-trip time) timer all expire, to determine that the UE can enter the sleep mode. Before these timers perform timing, the UE needs to configure timing duration of these timers based on a parameter of a currently activated bandwidth part (BWP).

However, the foregoing timing mechanism may not applicable to a BWP scenario.

SUMMARY

This application provides a method and an apparatus for controlling a timer, to optimize control over a timer in a BWP scenario.

According to a first aspect, an embodiment of this application provides a timer configuration method. After user equipment activates a first bandwidth part in response to a first message, the user equipment performs one of the following steps to optimize control over a timer in a BWP scenario: controlling a target timer to perform timing based on a unit time length of a second bandwidth part until the target timer is stopped or the target timer expires, and controlling the target timer to perform timing based on a unit time length of the first bandwidth part; or determining a first count value of a target timer that exists when the first bandwidth part is activated, determining a second count value of the target timer based on the first count value, and controlling the target timer to perform timing from the second count value of the target timer based on a unit time length of the first bandwidth part; or determining a first count value of a target timer that exists when the first bandwidth part is activated, determining a third count value based on a first count value, and controlling a target timer to perform timing based on a unit time length of the first bandwidth part and the third count value; or controlling a target timer to re-perform timing based on a unit time length of the first bandwidth part; or stopping a target timer or enabling a target timer to expire; or controlling a target timer to continue to perform timing based on a unit time length of the first bandwidth part.

In a possible design, the user equipment may determine the second count value of the target timer based on the first count value of the target timer and an adjustment multiple ratio, where the adjustment multiple ratio is determined based on the unit time length of the first bandwidth part and the unit time length of the second bandwidth part. For example, the adjustment multiple ratio may be equal to a value obtained by dividing the unit time length of the first bandwidth part by the unit time length of the second bandwidth part. In this case, the second count value may be equal to a value obtained by multiplying the first count value by the adjustment multiple ratio. Alternatively, the adjustment multiple ratio may be equal to a value obtained by dividing the unit time length of the second bandwidth part by the unit time length of the first bandwidth part. In this case, the second count value may be equal to a value obtained by dividing the first count value by the adjustment multiple ratio.

In a possible design, the third count value indicates remaining timing duration of the target timer that exists when the first bandwidth part is activated, and the remaining timing duration is used to indicate a quantity of remaining slots or a quantity of remaining symbols that are used by the target timer to perform timing based on the unit time length of the second bandwidth part before the target timer expires. For example, the target timer is a DRX-retransmission timer, and the user equipment configures timing duration of the DRX-retransmission timer to 10 slots. If a slot length of the second bandwidth part is 1 ms, and the user equipment activates the first bandwidth part when a count value of the DRX-retransmission timer is 8 ms, the first count value of the DRX-retransmission timer is 8 ms, and remaining timing duration of the DRX-retransmission timer is 2 ms. In this case, the third count value may be determined according to the following method: The third count value is determined by dividing the remaining timing duration of the DRX-retransmission timer by the slot length of the second bandwidth part, in other words, the third count value is 2.

In a possible design, the user equipment may determine that the unit time length of the first bandwidth part is greater than the unit time length of the second bandwidth part, or determine that the unit time length of the first bandwidth part is less than the unit time length of the second bandwidth part. When the unit time length of the first bandwidth part is the same as the unit time length of the second bandwidth part, the target timer is no longer adjusted.

In a possible design, the user equipment may further determine the unit time length of the first bandwidth part based on a received second message, and/or determine the unit time length of the second bandwidth part based on a received third message. Herein, the second message may be the same as the third message.

In a possible design, the unit time length is a slot length, and/or the unit time length is a symbol length. A slot length and/or a symbol length of the first bandwidth part may be determined based on a configuration of a subcarrier spacing of the first bandwidth part, and a slot length and/or a symbol length of the second bandwidth part may be determined based on a configuration of a subcarrier spacing of the second bandwidth part.

In a possible design, the user equipment may further activate the second bandwidth part based on the first message or a fourth message.

According to a second aspect, an embodiment of this application provides user equipment for controlling a timer, including a transceiver, a memory, and a processor. The transceiver is configured to perform communication between an authentication server and a terminal. The memory stores a computer program. The processor invokes the computer program stored in the memory, to implement the method performed by the user equipment in any one of the first aspect or the possible designs of the first aspect.

According to a third aspect, an embodiment of this application provides a computer-readable storage medium. The computer-readable storage medium stores a computer program. When the computer program is run on a computer, the computer is enabled to implement a function performed by the user equipment in any one of the first aspect or the possible designs of the first aspect.

According to a fourth aspect, an embodiment of this application provides a computer program product. When the computer program product runs on a computer, the computer is enabled to implement a function performed by the user equipment in any one of the first aspect or the possible designs of the first aspect.

According to a fifth aspect, an embodiment of this application provides a chip. The chip is coupled to a transceiver, and is configured to implement a function performed by the user equipment in any one of the first aspect or the possible designs of the first aspect.

According to a sixth aspect, an embodiment of this application further provides a method for controlling DRX active time, including:

determining, by user equipment, that a MAC entity of the user equipment is in DRX inactive time in a first slot; and determining, by the user equipment, not to perform SRS transmission and/or CSI transmission; where the determining, by user equipment, that a MAC entity of the user equipment is in DRX inactive time in a first slot includes:

receiving, by the user equipment, PDCCH scheduling information for a DRX control command in a second slot, where the DRX control command is used to instruct the user equipment to enter the DRX inactive time, the second slot is obtained by subtracting a slot offset from the first slot, and the slot offset is equal to any one of the following:

K0+k;
K0+k+1;
k+1;
k;
n−K0_max−k_max−1;
n−K0_max−k_max;
n−k_max−1; or
n−k_max;

where K0 represents an interval between a moment for receiving the PDCCH scheduling information in the second slot and a moment for scheduling a PDSCH resource based on the PDCCH scheduling information, k represents an interval between a slot in which the user equipment receives the PDSCH and a slot in which the user equipment performs HARQ feedback, K0_max represents a maximum value of K0, and k_max represents a maximum value of k.

Optionally, the method further includes:

receiving, by the user equipment, a first message, where the first message includes a value of K0.

Optionally, the method further includes:

receiving, by the user equipment, a second message, where the second message includes a value of k.

Optionally, the method further includes:

determining, by the user equipment, a slot length corresponding to a first BWP for receiving the DRX control command, and determining, based on the slot length, slot lengths corresponding to n, K0, and k; or determining, by the user equipment, a maximum slot length corresponding to a second BWP in a plurality of BWPs that are active currently, and determining, based on the determined slot length, slot lengths corresponding to n, K0, and k.

DESCRIPTION OF EMBODIMENTS

To make the objectives, technical solutions, and advantages of this application clearer, the following further describes this application in detail with reference to the accompanying drawings.

Embodiments of the present invention provide a method and an apparatus for controlling a timer. In the method, after user equipment activates a first bandwidth part in response to a first message, the user equipment performs one of the following steps to avoid impact of activation of a new BWP on normal communication of the UE: controlling a target timer to perform timing based on a unit time length of a second bandwidth part until the target timer is stopped or the target timer expires, and controlling the target timer to perform timing based on a unit time length of the first bandwidth part; or determining a first count value of a target timer that exists when the first bandwidth part is activated, determining a second count value of the target timer based on the first count value, and controlling the target timer to perform timing from the second count value of the target timer based on a unit time length of the first bandwidth part; or determining a first count value of a target timer that exists when the first bandwidth part is activated, determining a third count value based on a first count value, and controlling a target timer to perform, based on a unit time length of the first bandwidth part, timing based on a unit time length of the first bandwidth part and the third count value, timing for a quantity of times that is equal to the third count value; or controlling a target timer to re-perform timing based on a unit time length of the first bandwidth part; or stopping a target timer or enabling a target timer to expire; or controlling a target timer to continue to perform timing based on a unit time length of the first bandwidth part. In this way, impact of BWP switching or BWP addition on normal communication of the UE is avoided.

The following describes the embodiments of the present invention in detail with reference to the accompanying drawings. First, a communications system provided in the embodiments of the present invention is described. Then, a transmit end device and user equipment provided in the embodiments of the present invention are separately described. Finally, a method for controlling a timer provided in the embodiments of the present invention is described.

Figure 1:
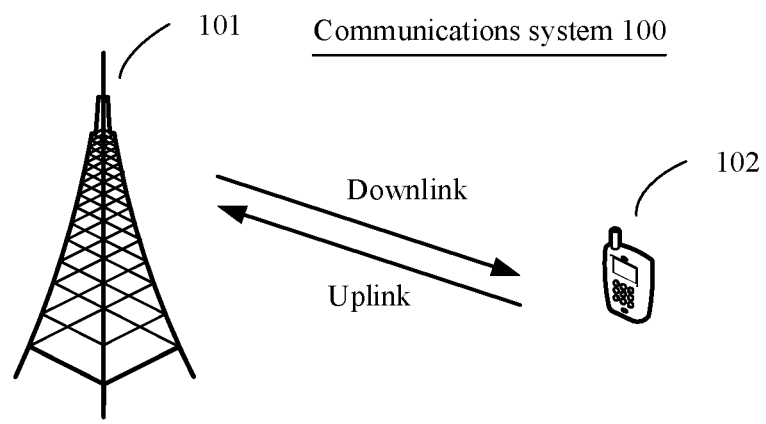
FIG. 1 is a schematic architectural diagram of a communications system according to an embodiment of this application.

FIG. 1 is a schematic structural diagram of a communications system 100 according to an embodiment of this application. The communications system 100 includes a network side device 101 and UE 102.

The communications system 100 provided in this embodiment of this application includes but is not limited to the following communications standards: global system for mobile communications (GSM), code division multiple access (CDMA) IS-95, code division multiple access (CDMA) 2000, time division-synchronous code division multiple access (TD-SCDMA), wideband code division multiple access (WCDMA), time division duplexing-long term evolution (TDD LTE), and frequency division duplexing-long term evolution (FDD LTE), long term evolution advanced (LTE-advanced), a personal handy-phone system (PHS), wireless fidelity (Wi-Fi) specified in the 802.11 protocols, a next-generation 5G mobile communications system (5th-generation, fifth-generation mobile communications system), and the like.

The network side device 101 may include a base station, or include a base station and a radio resource management device configured to control the base station. For example, for an LTE system such as a TDD LTE system, an FDD LTE system, or an LTE-A system, a network side device 101 in a wireless communications system 20 may be an evolved NodeB (eNodeB). For a TD-SCDMA system or a WCDMA system, a network side device 101 in a wireless communications system 20 may include a NodeB, or include a NodeB and a radio network controller (RNC). For a GSM system, a network side device 101 in a wireless communications system 20 may include a base transceiver station (BTS), or include a BTS and a base station controller (BSC).

The UE 102 may be a device such as a terminal, a mobile station (MS), or a mobile terminal. The UE 102 can communicate with one or more network side devices in one or more communications systems, and receive a network service provided by a network side device. The network side device herein includes but is not limited to the network side device 101. For example, in this embodiment of this application, the UE 102 may be a mobile phone (or referred to as a "cellular" phone), or a computer with a mobile terminal, or the UE 102 may be a portable, pocket-sized, handheld, computer built-in, or in-vehicle mobile apparatus. In addition, the UE 102 may alternatively be a communications chip having a communications module.

It should be understood that user equipment related to a timer configuration method provided in the embodiments of this application may be the UE 102 included in the communications system 100, and a network side device provided in the embodiments of this application may be the network side device 101.

Figure 2:
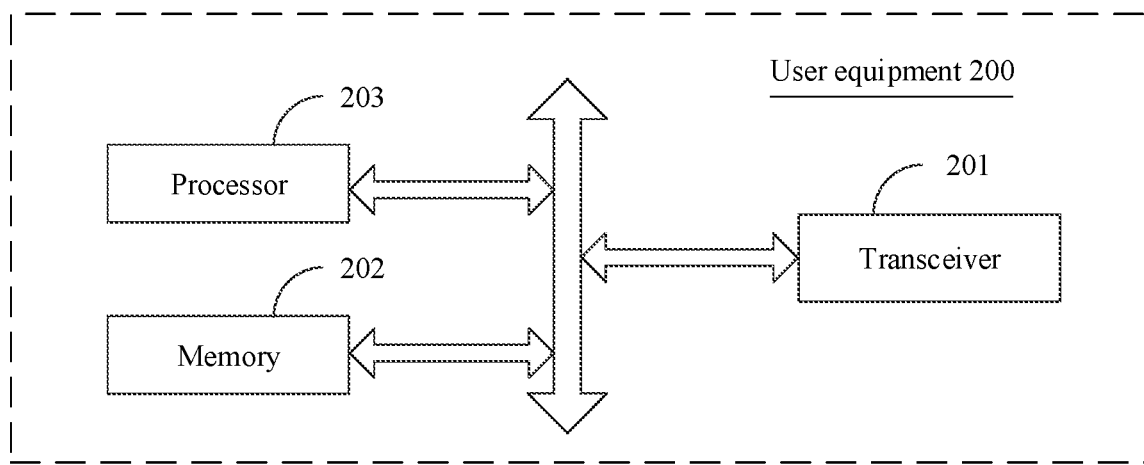
FIG. 2 is a schematic structural diagram of user equipment according to an embodiment of this application.

In implementation, the UE 102 shown in FIG. 1 may have a structure shown in FIG. 2. As shown in FIG. 2, UE 200 for controlling a timer according to an embodiment of this application includes a transceiver 201, a memory 202, and a processor 203. The transceiver 201 is configured to perform interaction by the UE 200. The memory 202 is configured to store a computer program or an instruction. The processor 203 is configured to execute the computer program or the instruction stored in the memory, to enable the UE 200 to implement steps performed by the UE 200 in the method for controlling a timer provided in the embodiments of this application.

The UE 102 is used as an example. When DRX is performed, the UE 102 needs to configure a DRX-retransmission timer and a DRX HARQ RTT timer based on a DRX parameter sent by the network side device 101.

The UE 102 may configure the DRX-retransmission timer based on a quantity of slots (slot) that is indicated by the network side device 101, and the UE 102 monitors a PDCCH channel based on the quantity of slots that is indicated by the network side device 101, to ensure that no retransmitted data is obtained through monitoring on the PDCCH channel within a slot length of the quantity of slots. DRX-retransmission timers may include an uplink DRX-retransmission timer (DRX-retransmission timer UL) and a downlink DRX-retransmission timer (DRX-retransmission timer DL). The uplink DRX-retransmission timer is used to indicate a maximum time length within which the PDCCH can be continuously monitored before uplink retransmitted data is received. The downlink DRX-retransmission timer is used to indicate a maximum time length within which the PDCCH can be continuously monitored before downlink retransmitted data is received.

The UE 102 may configure the DRX HARQ RTT timer based on a quantity of symbols that is indicated by the network side device 101, and the UE 102 ensures that no HARQ retransmission occurs within a symbol length of the quantity of symbols that is indicated by the network side device 101. DRX HARQ RTT timers may include an uplink DRX-HARQ-RTT timer (DRX-HARQ-RTT-Timer UL) and a downlink DRX-HARQ-RTT timer (DRX-HARQ-RTT-Timer DL). The uplink DRX-HARQ-RTT timer is used to indicate a minimum time length for which a media access control (MAC) layer entity of the UE 102 needs to wait before the MAC entity obtains an uplink grant (UL grant) for an uplink HARQ retransmission. The downlink DRX-HARQ-RTT timer is used to indicate a minimum time length for which the MAC entity of the UE 102 needs to wait before the MAC entity expects to obtain a resource allocated for a downlink HARQ retransmission.

Figure 3:
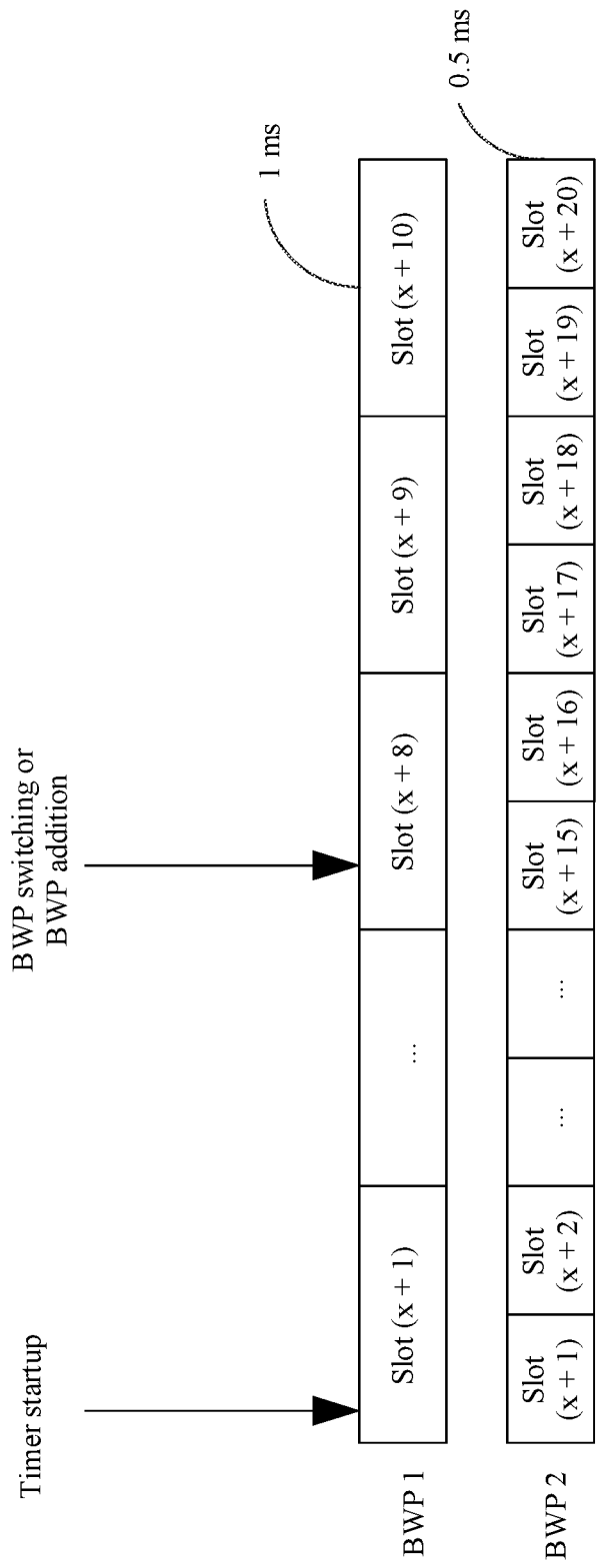
FIG. 3 is a schematic diagram of BWP switching according to an embodiment of this application.

For example, as shown in FIG. 3, the UE 102 may configure an uplink DRX-retransmission timer based on a quantity of slots that is configured by the network side device 101. For example, the UE 102 configures timing duration of the uplink DRX-retransmission timer to 10 slots, and it is assumed that a slot length of a BWP 1 currently activated by the UE 102 is 1 millisecond (ms). In this case, a time length of timing that actually needs to be performed by the DRX-retransmission timer is 10 ms. If the uplink DRX-retransmission timer with the time length of 10 ms expires, it indicates that monitoring has been performed in 10 slots corresponding to the BWP 1. For another example, the UE 102 configures timing duration of the uplink DRX-HARQ-RTT timer to 10 symbols, and it is assumed that a slot length of a BWP 1 currently activated by the UE 102 is 1 ms. If the slot length of the BWP 1 is seven times a symbol length of the BWP 1, to be specific, the symbol length of the BWP 1 is 0.143 ms, a time length of timing actually to be performed by the uplink DRX-HARQ-RTT timer is 1.43 ms. If the uplink DRX-HARQ-RTT timer with the time length of 1.43 ms expires, it indicates that monitoring has been performed in 10 symbols.

When the UE 102 needs to perform BWP switching from the activated BWP 1 to a BWP 2 shown in FIG. 3, or the UE 102 needs to activate a new BWP 2 on a basis of the BWP 1, if the UE 102 needs to transmit data on the new BWP 2, the UE 102 should control the DRX-retransmission timer to perform timing based on a quantity of slots and a slot length of the BWP 2 when the DRX-retransmission timer is started, and/or control the DRX HARQ RTT timer to perform timing based on a quantity of symbols and a symbol length of the BWP 2 when the DRX HARQ RTT timer is started. However, when the UE 102 activates the new BWP, the DRX-retransmission timer has started to perform timing based on the slot length of the BWP 1 that is previously activated by the UE 102, and has a count value; and/or the DRX HARQ RTT timer has been controlled to perform timing based on the symbol length of the BWP 1 that is previously activated by the UE 102, and has a count value. After the BWP 2 is activated, the DRX-retransmission timer can perform timing only based on the count value and the slot length of the BWP 2, and/or the DRX HARQ RTT timer can perform timing only based on the count value and the symbol length of the BWP 2. Because a slot length and a symbol length of a BWP may be determined based on a subcarrier spacing (SCS) of the BWP, and an SCS of the BWP 2 may be different from an SCS of the BWP 1 that is previously activated by the UE 102, the slot length of the BWP 2 is different from the slot length of the BWP 1 that is previously activated by the UE 102, and the symbol length of the BWP 2 is different from the symbol length of the BWP 1 that is previously activated by the UE 102. Based on the foregoing timing solution, the existing count value of the DRX-retransmission timer cannot accurately reflect a quantity of slots in which monitoring has been performed on the BWP 2, and/or the existing count value of the DRX HARQ RTT timer cannot accurately reflect a quantity of symbols in which monitoring has been performed on the BWP 2. Consequently, the UE 102 cannot accurately determine whether the UE 102 can enter a sleep mode.

Figure 4:
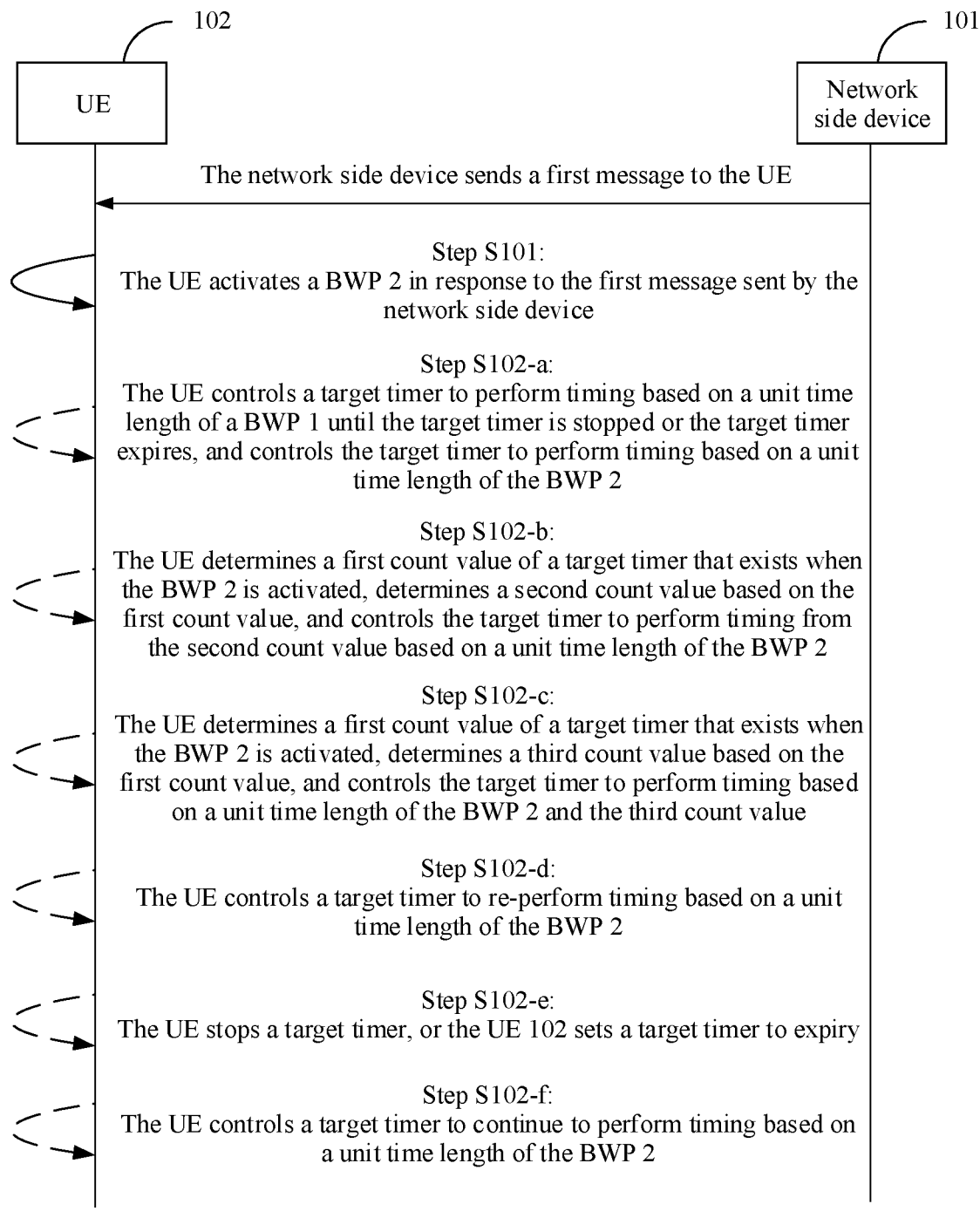
FIG. 4 is a schematic diagram of steps of a method for controlling a timer according to an embodiment of this application.

The following describes a timer configuration method according to an embodiment of this application by using a network side device 101 and UE 102 as an example in which a first bandwidth part is the BWP 2 shown in FIG. 2 and a second bandwidth part is the BWP 1 shown in FIG. 2. As shown in FIG. 4, the method includes the following steps:

Step S101: The UE 102 activates the BWP 2 in response to a first message sent by the network side device 101. Activating the BWP 2 herein may mean that the UE 102 performs BWP switching from the active BWP 1 to the BWP 2 or the UE 102 maintains the BWP 1 in an active state when activating the BWP 2.

Step S102-a: The UE 102 controls a target timer to perform timing based on a unit time length of the BWP 1 until the target timer is stopped or the target timer expires, and controls the target timer to perform timing based on a unit time length of the BWP 2.

Alternatively, step S102-b: The UE 102 determines a first count value of a target timer that exists when the BWP 2 is activated, determines a second count value based on the first count value, and controls the target timer to perform timing from the second count value based on a unit time length of the BWP 2.

Alternatively, step S102-c: The UE 102 determines a first count value of a target timer that exists when the BWP 2 is activated, determines a third count value based on the first count value, and controls the target timer to perform, based on a unit time length of the BWP 2, timing for a quantity of times that is equal to the third count value.

Alternatively, step S102-d: The UE 102 controls a target timer to re-perform timing based on a unit time length of the BWP 2.

Alternatively, step S102-e: The UE 102 stops a target timer, or the UE 102 sets a target timer to expiry.

Alternatively, step S102-f: The UE 102 controls a target timer to continue to perform timing based on a unit time length of the BWP 2.

The target timer includes a DRX-retransmission timer and/or a DRX HARQ RTT timer.

The BWP 1 is a bandwidth part that has been activated before the user equipment activates the BWP 2.

It should be noted that only one of steps S102-a, S102-b, S102-c, S102-d, S102-e, and S102-f is selected to be performed. Herein, DRX-retransmission timers may include an uplink DRX-retransmission timer and a downlink DRX-retransmission timer, and DRX HARQ RTT timers may include an uplink DRX HARQ RTT timer and a downlink DRX HARQ RTT timer.

When the foregoing steps are implemented, if the target timer is the DRX-retransmission timer, the unit time length is a slot length, and a time length of timing that needs to be performed by the DRX-retransmission timer can be determined based on the unit time length and a quantity of slots that is configured by the UE 102 for the DRX-retransmission timer. If the target timer is the DRX HARQ RTT timer, the unit time length is a symbol length, and a time length of timing that needs to be performed by the DRX HARQ RTT timer can be determined based on the unit time length and a quantity of symbols that is configured by the UE 102 for the DRX HARQ RTT timer. In implementation, a slot length and a symbol length of the BWP 1 may be determined based on a configuration of a subcarrier spacing of the BWP 1, and a slot length and a symbol length of the BWP 2 may be determined based on a configuration of a subcarrier spacing of the BWP 2.

When step S101 is implemented, the first message to which the UE 102 responds may be a command that is used to instruct the UE 102 to perform BWP switching from the activated BWP 1 to the BWP 2 and that is sent by the network side device 101 to the UE 102, or a command that is used to instruct the UE 102 to activate the new BWP 2 while maintaining the BWP 1 and that is sent by the network side device 101 to the UE 102. Specifically, the first message may be PDCCH signaling, or may be a MAC CE or a radio resource control (RRC) message.

In implementation, the network side device 101 may carry an identifier (identifier, ID) of the BWP 2 in the first message, and the UE 102 performs BWP switching based on known information about the BWP 2. For example, the network side device 101 may further send a second message to the UE 102, where the second message includes the information about the BWP 2. For example, the second message may be an RRC reconfiguration message, and may include some or all of: SCS information, slot length information, and symbol length information of the BWP 2. After receiving the first message, the UE 102 may perform BWP switching from the active BWP 1 to the BWP 2 based on the known information about the BWP 2 or activate the BWP 2 based on the known information about the BWP 2. In addition, information about the BWP 1 that has been activated by the UE 102 may alternatively be configured by the network side device 101 for the UE 102. For example, the network side device 101 carries the information about the BWP 1 in a third message that is sent to the UE 102, where the information about the BWP 1 is used by the UE 102 to activate the BWP 1. The third message may be an RRC reconfiguration message, and the information about the BWP 1 may include some or all of: SCS information, slot length information, and symbol length information of the BWP 1. In implementation, the network side device 101 may further send both the information about the BWP 1 and the information about the BWP 2 to the UE 102 by using a same message (for example, an RRC reconfiguration message), where the message may further include information about another BWP. After receiving the message, the UE 102 may send a response message to the network side device 101 for feedback.

It should be noted that this embodiment of this application does not exclude a case in which the network side device 101 sends the information about the BWP 2 to the UE 102 by using the first message, where the information about the BWP 2 is used by the UE 102 to activate the BWP 2. For example, the first message may include some or all of: SCS information, slot length information, and symbol length information of the BWP 2. Alternatively, the step of activating the BWP 2 by the UE 102 may be performed by the UE 102 in response to a fourth message after the UE 102 receives the fourth message, where the fourth message may be sent by the network side device 101.

Before step S102-*a*, S102-*b*, S102-*c*, S102-*d*, S102-*e*, or S102-*f* is implemented, the UE 102 may further determine a relationship between the unit time length of the BWP 1 and the unit time length of the BWP 2, to determine whether step S102-*a*, S102-*b*, S102-*c*, S102-*d*, S102-*e*, or S102-*f* needs to be performed.

Specifically, if the UE 102 determines, based on the first message, that the UE 102 needs to perform BWP switching from the activated BWP 1 to the BWP 2, the UE 102 may perform one of step S102-*a*, S102-*b*, S102-*c*, S102-*d*, S102-*e*, or S102-*f* after determining that the unit time length of the BWP 2 is different from the unit time length of the BWP 1. If the UE 102 determines that the slot length of the BWP 2 is different from the slot length of the BWP 1 (to be specific, the slot length of the BWP 2 is greater than the slot length of the BWP 1, or the slot length of the BWP 2 is less than the slot length of the BWP 1), the UE may perform one of step S102-*a*, S102-*b*, S102-*c*, S102-*d*, S102-*e*, or S102-*f* for the DRX-retransmission timer, to ensure that the DRX-retransmission timer does not expire at an earlier time or ensure that the DRX-retransmission timer does not expire at an earlier time or a later time, so as to avoid abnormal communication that occurs because a count value of the DRX-retransmission timer for the UE 102 is inaccurate. In addition, when the slot length of the BWP 1 is different from the slot length of the BWP 2, the symbol length of the BWP 1 is definitely different from the symbol length of the BWP 2. In this case, after determining that the slot length of the BWP 2 is different from the slot length of the BWP 1, the UE 102 may further perform one of step S102-*a*, S102-*b*, S102-*c*, S102-*d*, S102-*e*, or S102-*f* for or only for the DRX HARQ RTT timer. If the UE 102 determines that the symbol length of the BWP 2 is different from the symbol length of the BWP 1, the UE may perform one of step S102-*a*, S102-*b*, S102-*c*, S102-*d*, S102-*e*, or S102-*f*, to ensure that the DRX HARQ RTT timer does not expire at an earlier time or ensure that the DRX HARQ RTT timer does not expire at an earlier time or a later time, so as to avoid abnormal communication that occurs because a count value of the DRX HARQ RTT timer for the UE 102 is inaccurate. In addition, after determining that the symbol length of the BWP 2 is different from the symbol length of the BWP 1, the UE 102 may further perform one of step S102-*a*, S102-*b*, S102-*c*, S102-*d*, S102-*e*, or S102-*f* for or only for the DRX HARQ RTT timer.

In addition, if the UE 102 determines, based on the first message, that the UE 102 needs to activate the BWP 2 and perform communication through both the BWP 1 and the BWP 2, the UE 102 may perform one of step S102-*a*, S102-*b*, S102-*c*, S102-*d*, S102-*e*, or S102-*f* after determining that the unit time length of the BWP 2 is greater than the unit time length of the BWP 1. If the UE 102 determines that the slot length of the BWP 2 is greater than the slot length of the BWP 1, the UE 102 may perform one of step S102-*a*, S102-*b*, S102-*c*, S102-*d*, S102-*e*, or S102-*f* for the DRX-retransmission timer, to ensure that the DRX-retransmission timer does not expire at an earlier time or ensure that the DRX-retransmission timer does not expire at an earlier time or a later time, so as to avoid abnormal communication that occurs because a count value of the DRX-retransmission timer for the UE 102 is inaccurate. In addition, when the slot length of the BWP 2 is greater than the slot length of the BWP 1, the symbol length of the BWP 2 is definitely greater than the symbol length of the BWP 1. In this case, after determining that the slot length of the BWP 2 is different from the slot length of the BWP 1, the UE 102 may further perform one of step S102-*a*, S102-*b*, S102-*c*, S102-*d*, S102-*e*, or S102-*f* for or only for the DRX HARQ RTT timer. If the UE 102 determines that the symbol length of the BWP 2 is greater than the symbol length of the BWP 1, the UE may perform one of step S102-*a*, S102-*b*, S102-*c*, S102-*d*, S102-*e*, or S102-*f* for the DRX HARQ RTT timer, to ensure that the DRX HARQ RTT timer does not expire at an earlier time or ensure that the DRX HARQ RTT timer does not expire at an earlier time or a later time, so as to avoid abnormal communication that occurs because a count value of the DRX HARQ RTT timer for the UE 102 is inaccurate. In addition, after determining that the symbol length of the BWP 2 is greater than the symbol length of the BWP 1, the UE 102 may further perform one of step S102-*a*, S102-*b*, S102-*c*, S102-*d*, S102-*e*, or S102-*f* for or only for the DRX HARQ RTT timer.

When step S102-*a* is implemented, the UE 102 may control the target timer to continue performing timing based on the unit time length of the BWP 1, and after the target timer is stopped or expires, the UE 102 restarts the target timer, and controls the target timer to perform timing based on the unit time length of the BWP 1. Specifically, the UE 102 may control the DRX-retransmission timer to continue performing timing based on the slot length of the BWP 1 until the DRX-retransmission timer is stopped or the DRX-retransmission timer expires; and after starting the DRX-retransmission timer next time, the UE 102 may control the DRX-retransmission timer to perform timing based on the slot length of the BWP 2. That the DRX-retransmission timer is stopped may be that the DRX-retransmission timer is stopped under control of the UE 102.

In an implementation, if the UE 102 determines that the slot length of the newly activated BWP 2 is less than the slot length of the previously activated BWP 1, after activating the BWP 2, the UE 102 may control the DRX-retransmission timer to continue performing timing based on the slot length of the BWP 1 until the DRX-retransmission timer is stopped or the DRX-retransmission timer expires; and after restarting the DRX-retransmission timer, the UE 102 may control the DRX-retransmission timer to perform timing based on the slot length of the BWP 2. In addition, if the UE 102 determines that the slot length of the newly activated BWP 2 is greater than the slot length of the previously activated BWP 1, after activating the BWP 2, the UE 102 may control the DRX-retransmission timer to continue to perform timing based on the slot length of the BWP 2 until the DRX-retransmission timer is stopped or the DRX-retransmission timer expires; and after restarting the DRX-retransmission timer, the UE 102 may control the DRX-retransmission timer to perform timing based on the slot length of the BWP 2.

For example, as shown in FIG. 2, if the UE 102 configures timing duration of the DRX-retransmission timer to 10 slots, and the slot length of the BWP 1 is 1 ms, a time length of the DRX-retransmission timer based on the slot length of the BWP 1 is 10 ms. It is assumed that the DRX-retransmission timer runs for 8 ms when the UE 102 activates the BWP 2. In this case, according to step S102-*a*, the UE 102 may continue performing timing for 2 ms based on the slot length of 1 ms until the DRX-retransmission timer expires. Then, the UE 102 controls the DRX-retransmission timer to perform timing based on the slot length of the BWP 2. If the slot length of the BWP 2 is 0.5 ms, a time length of the DRX-retransmission timer is changed to 5 ms. In the foregoing example, it is assumed that the DRX-retransmission timer runs for 8 ms when the UE 102 activates the BWP 2 (if timing is performed based on the slot length of the BWP 1, compared with the time length of 10 ms, a count value of 8 ms means that the DRX-retransmission timer does not expire). However, the time length of the DRX-retransmission timer based on the slot length of the BWP 2 is only 5 ms (compared with the time length of 5 ms, the count value of 8 ms means that the DRX-retransmission timer expires). When BWP switching to the BWP 2 is performed, the DRX-retransmission timer may expire, and consequently the UE 102 enters a sleep mode at an earlier time. However, if the UE 102 controls the DRX-retransmission timer to perform timing based on the slot length of 1 ms until the DRX-retransmission timer expires, the UE 102 may be prevented from entering the sleep mode at an earlier time. In this way, normal communication is not affected.

In addition, the UE 102 may further control the DRX HARQ RTT timer to continue performing timing based on the symbol length of the BWP 1 until the DRX HARQ RTT timer is stopped or the DRX HARQ RTT timer expires; and after the DRX-retransmission timer is started next time, the UE 102 may control the DRX HARQ RTT timer to perform timing based on the symbol length of the BWP 2. That the DRX HARQ RTT timer is stopped may be that the DRX HARQ RTT timer is stopped under control of the UE 102.

When step S102-*b* is implemented, the UE 102 may determine the second count value of the target timer based on the first count value of the target timer and an adjustment multiple ratio, where the adjustment multiple ratio may be determined based on the unit time length of the BWP 2 and the unit time length of the BWP 1. Then, the UE 102 may control the target timer to perform timing from the second count value based on the unit time length of the BWP 2.

Specifically, if the target timer is the DRX-retransmission timer, the UE 102 may determine a first count value of the DRX-retransmission timer that exists when the BWP 2 is activated, and determine a second count value based on the first count value and the adjustment multiple ratio. Then, the UE 102 may control the DRX-retransmission timer to perform timing from the second count value based on the slot length of the BWP 2 (to be specific, perform timing from the second count value until the DRX-retransmission timer expires, where a time length existing when the DRX-retransmission timer expires is determined based on the quantity of slots that is configured by the UE 102 and the slot length of the BWP 2). The adjustment multiple ratio may be determined based on the slot length of the BWP 2 and the slot length of the BWP 1, or may be determined based on the symbol length of the BWP 2 and the symbol length of the BWP 1. For example, if the adjustment multiple ratio is equal to a ratio of the slot length of the BWP 2 to the slot length of the BWP 1, the second count value is equal to a value obtained by multiplying the first count value by the adjustment multiple ratio. If the adjustment multiple ratio is equal to a ratio of the slot length of the BWP 1 to the slot length of the BWP 2, the second count value is equal to a value obtained by dividing the first count value by the adjustment multiple ratio.

For example, as shown in FIG. 2, if the UE 102 configures timing duration of the DRX-retransmission timer to 10 slots, and the slot length of the BWP 1 is 1 ms, a time length of the DRX-retransmission timer based on the slot length of the BWP 1 is 10 ms. It is assumed that the DRX-retransmission timer runs for 8 ms when the UE 102 activates the BWP 2. In this case, according to step S102-*b*, the UE 102 may determine that a count value of the DRX-retransmission timer is 8 ms. In addition, the UE 102 may determine that the slot length of the BWP 2 is 0.5 ms. In this case, a ratio of the slot length of the BWP 2 to the slot length of the BWP 1 is 1:2, and the UE 102 may determine that the second count value is 4 (that is, 8×1/2) ms, and control the DRX-retransmission timer to perform timing from 4 ms. The DRX-retransmission timer expires when a count value is 5 ms (because the UE 102 configures the timing duration of the DRX-retransmission timer to 10 slots, a time length of the DRX-retransmission timer based on the slot length of the BWP 2 is 5 ms, in other words, the DRX-retransmission timer expires when the count value reaches 5 ms). According to the method, a case in which the DRX-retransmission timer expires at an earlier time or a later time can be avoided, and therefore normal communication is not affected.

Correspondingly, when step S102-*b* is implemented, the UE 102 may further determine a first count value of the DRX HARQ RTT timer that exists when the UE 102 activates the BWP 2, and determine an adjustment multiple ratio for determining a second count value. Then, the UE 102 may control the DRX HARQ RTT timer to perform timing from the second count value based on the symbol length of the BWP 2. The adjustment multiple ratio may be equal to a value obtained by dividing the slot length of the BWP 2 by the slot length of the BWP 1, and the second count value is a value obtained by multiplying, by the adjustment multiple ratio, the count value of the DRX HARQ RTT timer that exists when the UE 102 activates the BWP 2. Alternatively, the adjustment multiple ratio may be equal to a value obtained by dividing the slot length of the BWP 1 by the slot length of the BWP 2, and the second count value is a value obtained by dividing, by the adjustment multiple ratio, the count value of the DRX HARQ RTT timer that exists when the UE 102 activates the BWP 2. In addition, the adjustment multiple ratio may alternatively be equal to a value obtained by dividing the symbol length of the BWP 2 by the symbol length of the BWP 1, and the second count value is a value obtained by multiplying, by the adjustment multiple ratio, the count value of the DRX HARQ RTT timer that exists when the UE 102 activates the BWP 2. Alternatively, the adjustment multiple ratio may be equal to a value obtained by dividing the symbol length of the BWP 1 by the symbol length of the BWP 2, and the second count value is a value obtained by dividing, by the adjustment multiple ratio, the count value of the DRX HARQ RTT timer that exists when the UE 102 activates the BWP 2.

When step S102-c is implemented, the third count value may indicate remaining timing duration of the target timer that exists when the BWP 2 is activated, and the remaining timing duration is used to indicate a quantity of remaining slots or a quantity of remaining symbols that are used by the target timer to perform timing based on the unit time length of the BWP 1 before the target timer expires. The UE 102 may determine the third count value based on the remaining timing duration of the target timer and the unit time length of the BWP 1, where the remaining timing duration of the target timer may be determined by the UE 102 based on the first count value of the target timer that exists when the BWP 2 is activated. After determining the third count value, the UE 102 may control the target timer to perform timing based on the unit time length of the BWP 2 and the third count value. For example, the UE 102 controls the target timer to perform timing for a quantity of times that is equal to the third count value, and a time length of each timing is the unit time length of the BWP 2.

Specifically, if the target timer is the DRX-retransmission timer, the UE 102 may determine a first count value of the DRX-retransmission timer that exists when the BWP 2 is activated, and obtain a third count value by dividing, by the slot length of the BWP 1, remaining timing duration of the DRX-retransmission timer that exists when the BWP 2 is activated. As shown in FIG. 2, if the UE 102 configures timing duration of the DRX-retransmission timer to 10 slots, and the slot length of the BWP 1 is 1 ms, a time length of the DRX-retransmission timer based on the slot length of the BWP 1 is 10 ms. It is assumed that the DRX-retransmission timer runs for 4 ms when the UE 102 activates the BWP 2. In this case, according to step S102-c, the UE 102 may determine that a count value of the DRX-retransmission timer is 4 ms, in other words, the first count value is 4 ms, and remaining timing duration of the DRX-retransmission timer is 6 ms. The UE 102 determines, by dividing the remaining timing duration by the slot length of the BWP 1, that the third count value is 6. Then, after activating the BWP 2, the UE 102 may control the DRX-retransmission timer to continue performing timing for 3 (i.e. 6 times×0.5 ms) ms based on the count value of 4 ms.

Correspondingly, when step S102-c is implemented, the UE 102 may further determine a first count value of the DRX HARQ RTT timer that exists when the UE 102 activates the BWP 2, and determine a third count value. Then, the UE 102 may control the DRX HARQ RTT timer to perform timing based on the symbol length of the BWP 2 and the third count value. The third count value may be determined by dividing, by the symbol length of the BWP 1, remaining timing duration of the DRX HARQ RTT timer that exists when the BWP 2 is activated.

When step S102-d is implemented, after activating the BWP 2, the UE 102 may restart the DRX-retransmission timer, and control the DRX-retransmission timer to perform timing based on the slot length of the BWP 2.

For example, as shown in FIG. 2, if the UE 102 configures timing duration of the DRX-retransmission timer to 10 slots, the slot length of the BWP 1 is 1 ms, and the slot length of the BWP 2 is 0.5 ms, a time length of the DRX-retransmission timer based on the slot length of the BWP 1 is 10 ms. It is assumed that the DRX-retransmission timer runs for 8 ms when the UE 102 activates the BWP 2. In this case, according to step S102-d, the UE 102 restarts the DRX-retransmission timer for timing, and controls the DRX-retransmission timer to perform timing based on the slot length of 0.5 ms of the BWP 2. In other words, the UE 102 controls the DRX-retransmission timer to perform timing for a time length of 5 ms based on the slot length of the BWP 2. According to this solution, after BWP switching to the BWP 2 is performed, the UE 102 controls the DRX-retransmission timer to perform complete timing for a slot length of a specified quantity of slots based on the slot length of the BWP 2. In this way, the UE 102 can be prevented from entering a sleep mode at an earlier time because the DRX-retransmission timer expires, and normal communication is not affected.

Correspondingly, when step S102-d is implemented, after activating the BWP 2, the UE 102 may further restart the DRX HARQ RTT timer, and control the DRX HARQ RTT timer to perform timing based on the symbol length of the BWP 2.

When step S102-e is implemented, after activating the BWP 2, the UE 102 may stop the DRX-retransmission timer and/or the DRX HARQ RTT timer. In addition, after activating the BWP 2, the UE 102 may alternatively set the DRX-retransmission timer and/or the DRX HARQ RTT timer to expiry. In implementation, after the UE 102 stops the DRX-retransmission timer or sets the DRX-retransmission timer to expiry, the UE 102 may no longer monitor and detect, on a PDCCH channel, a data packet that is scheduled by the network side device 101 and that is retransmitted in a HARQ process corresponding to the timer. In addition, after the UE 102 stops the DRX HARQ RTT timer or sets the DRX HARQ RTT timer to expiry, the UE 102 may start a DRX-retransmission timer in a HARQ process corresponding to the DRX HARQ RTT timer. After starting the DRX-retransmission timer, the UE 102 may monitor the PDCCH channel to obtain a retransmission scheduled in the HARQ process.

When step S102-f is implemented, the UE 102 may alternatively control the target timer to continue to perform timing based on the unit time length of the BWP 2.

Specifically, the UE 102 still maintains the BWP 1 after activating a BWP 2, where a slot length of the BWP 2 is 2 ms, and the slot length of the BWP 1 is 1 ms. In this case, after the UE 102 activates the BWP 2, the UE 102 may control the DRX-retransmission timer to perform timing based on the slot length of the BWP 1, and/or the UE 102 controls the DRX HARQ RTT timer to perform timing based on the symbol length of the BWP 1, to prevent the DRX-retransmission timer and/or the DRX HARQ RTT timer from expiring at an earlier time. In this case, after the UE 102 activates the BWP 2, if the UE 102 still controls the DRX-retransmission timer to perform timing based on the slot length of the BWP 1, when the DRX-retransmission timer expires, a quantity of slots in which the UE 102 performs monitoring on the BWP 2 has not reached the quantity of slots that is configured by the UE 102 for the DRX-retransmission timer. Consequently, the DRX-retransmission timer expires at an earlier time, and the UE 102 may not receive scheduling information in time based on the BWP 2.

Figure 5A:
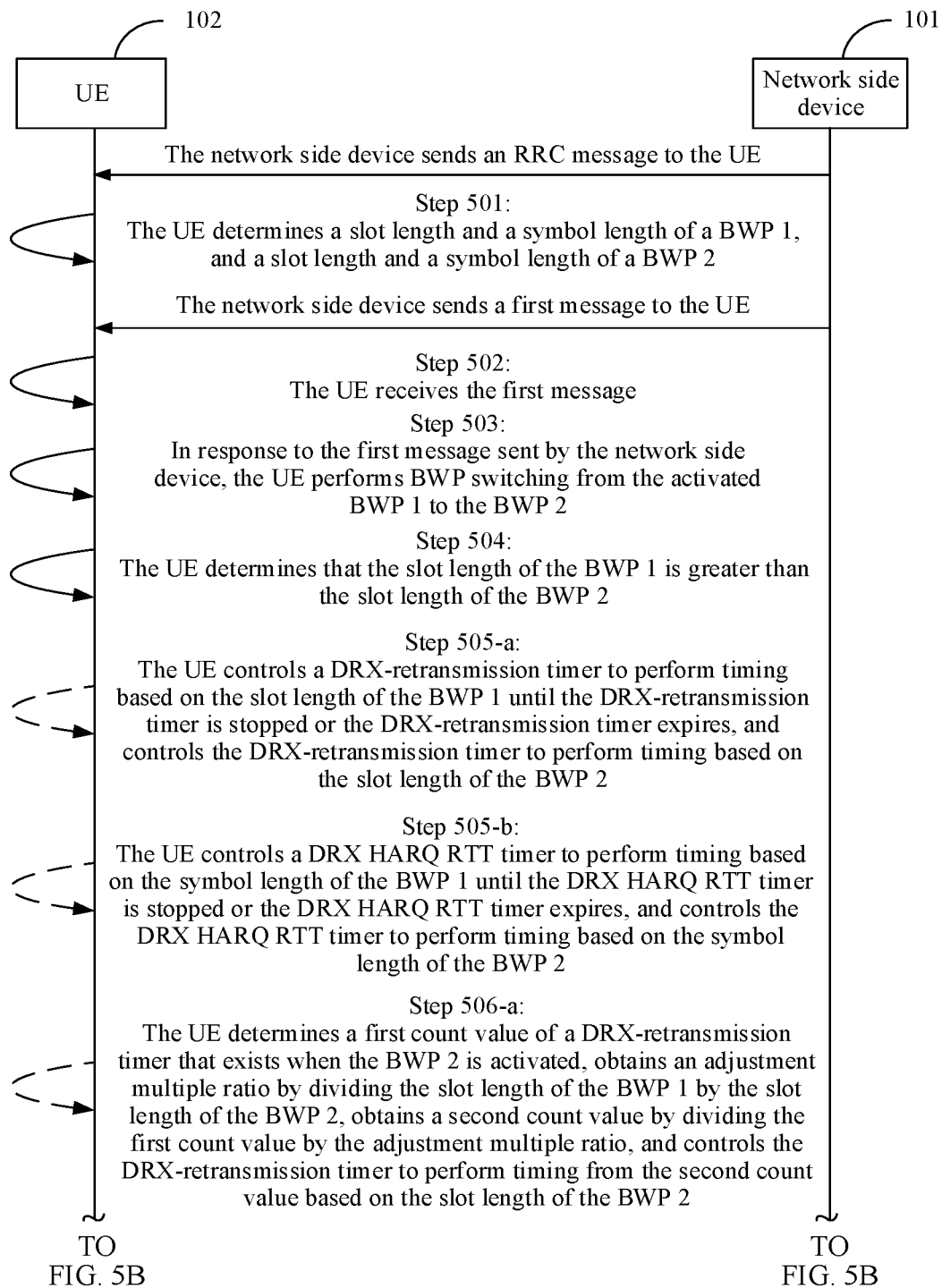
FIG. 5A and FIG. 5B are a schematic diagram of specific steps of a method for controlling a timer according to an embodiment of this application.
Figure 5B:
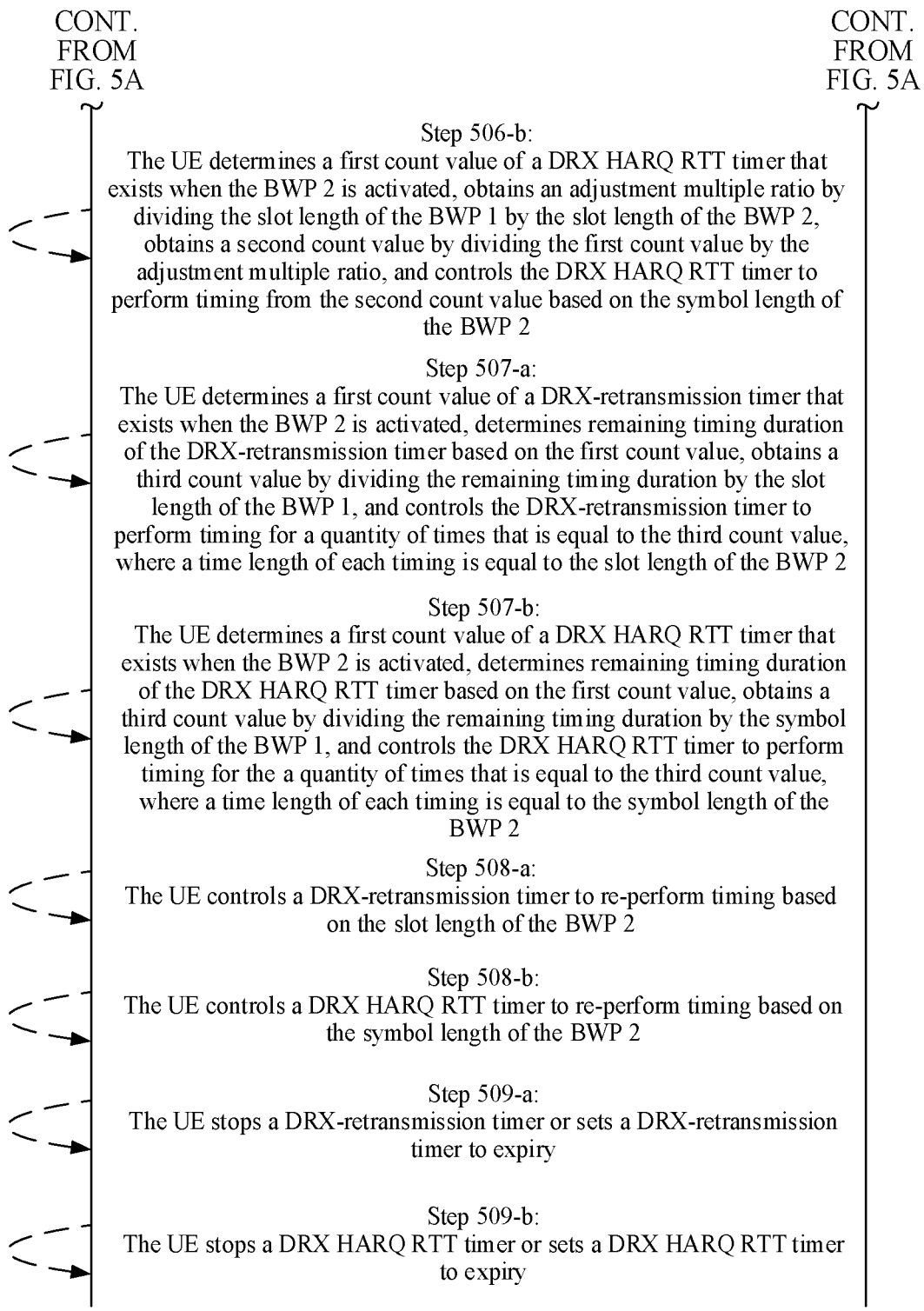

As shown in FIG. 5A and FIG. 5B, when UE 102 performs BWP switching from an activated BWP 1 to a BWP 2 based on a first message sent by a network side device 101, where a slot length of the BWP 1 is 1 ms, and a slot length of the BWP 2 is 0.5 ms, a method for controlling a timer provided in an embodiment of this application specifically includes the following steps:

Step 501: The UE 102 determines the slot length and a symbol length of the BWP 1, and the slot length and a symbol length of the BWP 2 based on an RRC reconfiguration message sent by the network side device 101.

Step 502: The UE 102 receives the first message sent by the network side device 101, where the first message is used to indicate the UE 102 to perform BWP switching from the activated BWP 1 to the BWP 2.

Step 503: In response to the first message, the UE 102 performs BWP switching from the activated BWP 1 to the BWP 2.

Step 504: The UE 102 determines that the slot length of the BWP 1 is greater than the slot length of the BWP 2, then performs any one of step 505-*a*, 506-*a*, 507-*a*, 508-*a*, or 509-*a* to adjust a DRX-retransmission timer, and performs any one of step 505-*b*, 506-*b*, 507-*b*, 508-*b*, or 509-*b* to adjust a DRX HARQ RTT timer.

Step 505-*a*: The UE 102 controls the DRX-retransmission timer to perform timing based on the slot length of the BWP 1 until the DRX-retransmission timer is stopped or the DRX-retransmission timer expires, and controls the DRX-retransmission timer to perform timing based on the slot length of the BWP 2.

Step 505-*b*: The UE 102 controls the DRX HARQ RTT timer to perform timing based on the symbol length of the BWP 1 until the DRX HARQ RTT timer is stopped or the DRX HARQ RTT timer expires, and controls the DRX HARQ RTT timer to perform timing based on the symbol length of the BWP 2.

Step 506-*a*: The UE 102 determines a first count value of the DRX-retransmission timer that exists when the BWP 2 is activated, obtains an adjustment multiple ratio by dividing the slot length of the BWP 1 by the slot length of the BWP 2, obtains a second count value by dividing the first count value by the adjustment multiple ratio, and controls the DRX-retransmission timer to perform timing from the second count value based on the slot length of the BWP 2.

Step 506-*b*: The UE 102 determines a first count value of the DRX HARQ RTT timer that exists when the BWP 2 is activated, obtains an adjustment multiple ratio by dividing the slot length of the BWP 1 by the slot length of the BWP 2, obtains a second count value by dividing the first count value by the adjustment multiple ratio, and controls the DRX HARQ RTT timer to perform timing from the second count value based on the symbol length of the BWP 2.

Step 507-*a*: The UE 102 determines a first count value of the DRX-retransmission timer that exists when the BWP 2 is activated, determines remaining timing duration of the DRX-retransmission timer based on the first count value, obtains a third count value by dividing the remaining timing duration by the slot length of the BWP 1, and controls the DRX-retransmission timer to perform timing for a quantity of times that is equal to the third count value, where a unit time length of each timing is equal to the slot length of the BWP 2.

Step 507-*b*: The UE 102 determines a first count value of the DRX HARQ RTT timer that exists when the BWP 2 is activated, determines a remaining timing duration of the DRX HARQ RTT timer based on the first count value, obtains a third count value by dividing the remaining timing duration by the symbol length of the BWP 1, and controls the DRX HARQ RTT timer to perform timing for a quantity of times that is equal to the third count value, where a unit time length of each timing is equal to the symbol length of the BWP 2.

Step 508-*a*: The UE 102 controls the DRX-retransmission timer to re-perform timing based on the slot length of the BWP 2.

Step 508-*b*: The UE 102 controls the DRX HARQ RTT timer to re-perform timing based on the symbol length of the BWP 2.

Step 509-*a*: The UE 102 stops the DRX-retransmission timer or sets the DRX-retransmission timer to expiry.

Step 509-*b*: The UE 102 stops the DRX HARQ RTT timer or sets the DRX HARQ RTT timer to expiry.

Figure 6A:
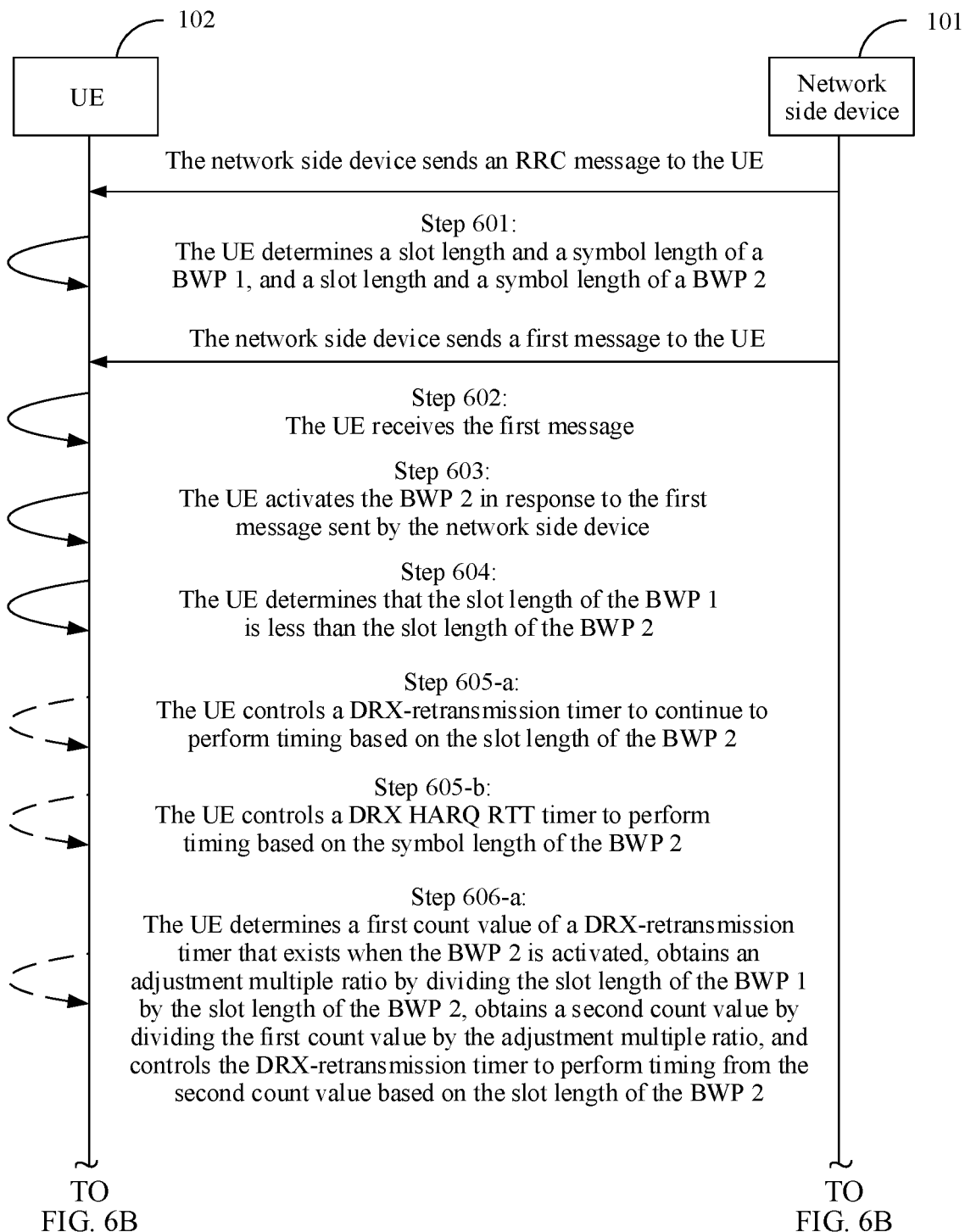
FIG. 6A and FIG. 6B are a schematic diagram of specific steps of another method for controlling a timer according to an embodiment of this application.
Figure 6B:
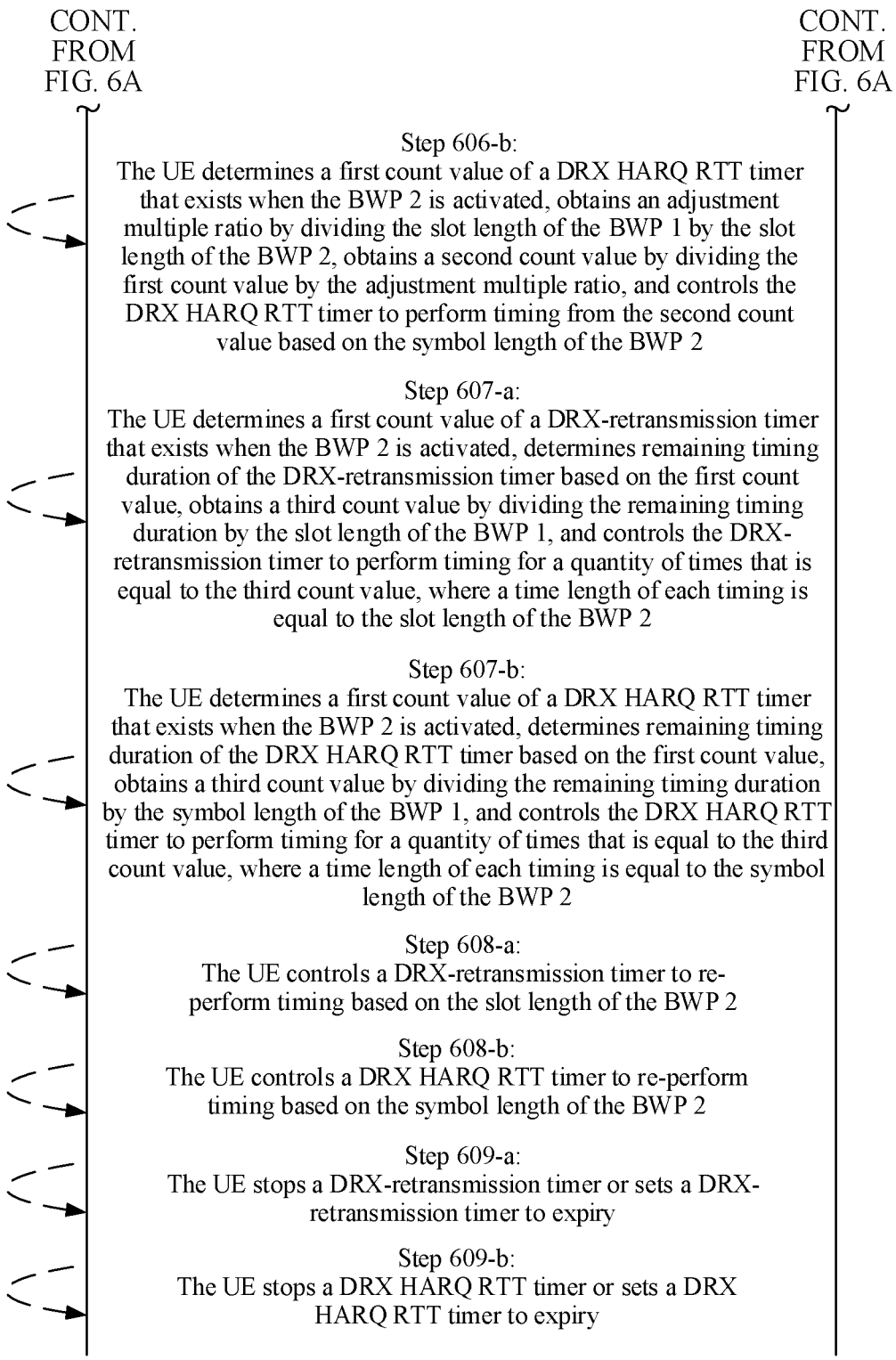

As shown in FIG. 6A and FIG. 6B, when UE 102 activates a BWP 2 based on a first message sent by a network side device 101, and maintains an activated BWP 1 in an active state, where a slot length of the BWP 1 is 0.5 ms, and a slot length of the BWP 2 is 1 ms, a method for controlling a timer provided in an embodiment of this application specifically includes the following steps:

Step 601: The UE 102 determines the slot length and a symbol length of the BWP 1, and the slot length and a symbol length of the BWP 2 based on an RRC reconfiguration message sent by the network side device 101.

Step 602: The UE 102 receives the first message sent by the network side device 101, where the first message is used to indicate the UE 102 to perform BWP switching from the activated BWP 1 to the BWP 2.

Step 603: The UE 102 activates the BWP 2 in response to the first message.

Step 604: The UE 102 determines that the slot length of the BWP 1 is less than the slot length of the BWP 2, then performs any one of step 605-*a*, 606-*a*, 607-*a*, 608-*a*, or 609-*a* to adjust a DRX-retransmission timer, and performs any one of step 605-*a*, 606-*b*, 607-*b*, 608-*b*, or 609-*b* to adjust a DRX HARQ RTT timer.

Step 605-*a*: The UE 102 controls the DRX-retransmission timer to continue to perform timing based on the slot length of the BWP 2.

Step 605-*b*: The UE 102 controls the DRX HARQ RTT timer to perform timing based on the symbol length of the BWP 2.

Step 606-*a*: The UE 102 determines a first count value of the DRX-retransmission timer that exists when the BWP 2 is activated, obtains an adjustment multiple ratio by dividing the slot length of the BWP 1 by the slot length of the BWP 2, obtains a second count value by dividing the first count value by the adjustment multiple ratio, and controls the DRX-retransmission timer to perform timing from the second count value based on the slot length of the BWP 2.

Step 606-*b*: The UE 102 determines a first count value of the DRX HARQ RTT timer that exists when the BWP 2 is activated, obtains an adjustment multiple ratio by dividing the slot length of the BWP 1 by the slot length of the BWP 2, obtains a second count value by dividing the first count value by the adjustment multiple ratio, and controls the DRX HARQ RTT timer to perform timing from the second count value based on the symbol length of the BWP 2.

Step 607-*a*: The UE 102 determines a first count value of the DRX-retransmission timer that exists when the BWP 2 is activated, determines remaining timing duration of the DRX-retransmission timer based on the first count value, obtains a third count value by dividing the remaining timing duration by the slot length of the BWP 1, and controls the DRX-retransmission timer to perform timing for a quantity of times that is equal to the third count value, where a unit time length of each timing is equal to the slot length of the BWP 2.

Step 607-*b*: The UE 102 determines a first count value of the DRX HARQ RTT timer that exists when the BWP 2 is activated, determines remaining timing duration of the DRX HARQ RTT timer based on the first count value, obtains a third count value by dividing the remaining timing duration by the symbol length of the BWP 1, and controls the DRX HARQ RTT timer to perform timing for a quantity of times that is equal to the third count value, where a unit time length of each timing is equal to the symbol length of the BWP 2.

Step 608-*a*: The UE 102 controls the DRX-retransmission timer to re-perform timing based on the slot length of the BWP 2.

Step 608-*b*: The UE 102 controls the DRX HARQ RTT timer to re-perform timing based on the symbol length of the BWP 2.

Step 609-*a*: The UE 102 stops the DRX-retransmission timer or sets the DRX-retransmission timer to expiry.

Step 609-*b*: The UE 102 stops the DRX HARQ RTT timer or sets the DRX HARQ RTT timer to expiry.

Based on a same concept as that in the foregoing method embodiments, an embodiment of this application further provides user equipment configured to implement the method performed by user equipment in the embodiments of this application. In specific implementation, the user equipment may be user equipment configured to implement the foregoing methods, or another device or hardware having such a type of function. The user equipment may have the structure shown in FIG. 2.

FIG. 2 is a schematic diagram of a possible logical structure of the user equipment 200 related to the foregoing embodiment according to an embodiment of this application. The user equipment 200 includes a processor 203. In this embodiment of this application, the processor 203 is configured to control and manage an action of the user equipment 200. The user equipment 200 may further include a transceiver 201 and a memory 202. The memory 202 is configured to store a computer program of the user equipment 200. The transceiver 201 is configured to support the user equipment 200 to perform communication.

In the user equipment shown in FIG. 2, the processor 203 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Specifically, in the user equipment 200 shown in FIG. 2, the transceiver 201 is configured to perform communication by the user equipment.

The memory 202 is configured to store computer code or an instruction.

The processor 203 is configured to invoke the computer code or the instruction in the memory 202, to perform the following steps:

activating a first bandwidth part in response to a first message received via the transceiver 201; and controlling a target timer to perform timing based on a unit time length of a second bandwidth part until the target timer is stopped or the target timer expires, and controlling the target timer to perform timing based on a unit time length of the first bandwidth part; or determining a first count value of a target timer that exists when the first bandwidth part is activated, determining a second count value of the target timer based on the first count value, and controlling the target timer to perform timing from the second count value of the target timer based on a unit time length of the first bandwidth part; or determining a first count value of a target timer that exists when the first bandwidth part is activated, determining a third count value based on the first count value, and controlling the target timer to perform, based on a unit time length of the first bandwidth part, timing for a quantity of times that is equal to the third count value; or controlling a target timer to re-perform timing based on a unit time length of the first bandwidth part; or stopping a target timer or setting a target timer to expiry; or controlling a target timer to continue to perform timing based on a unit time length of the first bandwidth part.

The target timer includes a DRX-retransmission timer and/or a DRX HARQ RTT timer.

The second bandwidth part is a bandwidth part that has been activated before the first bandwidth part is activated.

Optionally, the processor 203 is specifically configured to:

determine the second count value of the target timer based on the first count value of the target timer and an adjustment multiple ratio, where the adjustment multiple ratio is determined based on the unit time length of the first bandwidth part and the unit time length of the second bandwidth part.

Optionally, the adjustment multiple ratio is a ratio of the unit time length of the first bandwidth part to the unit time length of the second bandwidth part.

Alternatively, the adjustment multiple ratio is a ratio of the unit time length of the second bandwidth part to the unit time length of the first bandwidth part.

Optionally, the third count value indicates remaining timing duration of the target timer that exists when the first bandwidth part is activated, and the remaining timing duration is used to indicate a quantity of remaining slots or a quantity of remaining symbols that are used by the target timer to perform timing based on the unit time length of the second bandwidth part before the target timer expires.

Optionally, the processor 203 is further configured to:

determine that the unit time length of the first bandwidth part is greater than the unit time length of the second bandwidth part; or determine that the unit time length of the first bandwidth part is less than the unit time length of the second bandwidth part.

Optionally, the processor 203 is further configured to:

determine the unit time length of the first bandwidth part based on a received second message; and/or determine the unit time length of the second bandwidth part based on a received third message.

Optionally, the unit time length is a slot length, and/or the unit time length is a symbol length.

Optionally, a slot length and/or a symbol length of the first bandwidth part are/is determined based on a configuration of a subcarrier spacing of the first bandwidth part, and a slot length and/or a symbol length of the second bandwidth part are/is determined based on a configuration of a subcarrier spacing of the second bandwidth part.

Optionally, the processor 203 is further configured to:

activate the second bandwidth part in response to the first message received via the transceiver 201; or receive a fourth message via the transceiver 201, and activate the second bandwidth part in response to the fourth message.

In addition, in this embodiment of this application, the user equipment may be divided into functional modules based on the foregoing method embodiments. For example, the functional modules may be obtained through division based on corresponding functions, or two or more functions may be integrated into one processing module. The integrated module may be implemented in a form of hardware, or may be implemented in a form of a software functional module. It should be noted that, in the embodiments of this application, division into the modules is merely an example and logical function division, and may be other division in actual implementation.

Figure 7:
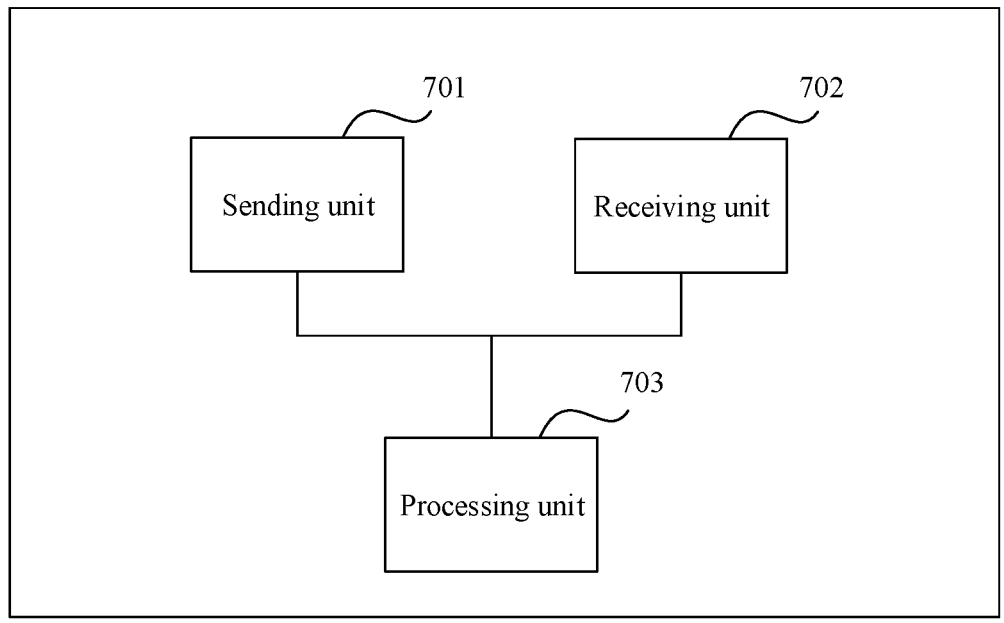
FIG. 7 is a schematic structural diagram of another user equipment according to an embodiment of this application.

When the functional modules are obtained through division based on the corresponding functions, FIG. 7 is a schematic diagram of a possible structure of the user equipment related to the foregoing embodiments. The user equipment includes a sending unit 701 and a receiving unit 702. The sending unit 701 is configured to support the user equipment to perform a step of sending a message by the user equipment in the foregoing method embodiments. The receiving unit 702 is configured to support the user equipment to perform a step of receiving a message by the user equipment in the foregoing method embodiments. In implementation, the user equipment further includes a processing unit 703. The processing unit 703 is configured to support the user equipment to perform a step of determining information by the user equipment in the foregoing method embodiments, for example, determining a unit time length of a BWP 1 and/or a unit time length of a BWP 2, and/or controlling a timer to perform timing, and a function that needs to be implemented by the user equipment other than the functions of the sending unit 701 and the receiving unit 702.

When being implemented by hardware, the processing unit 703 may be a processor, a processing circuit, or the like; the sending unit 701 may be a transmitter, a transmitter circuit, or the like; and the receiving unit 702 may be a receiver, a receiver circuit, or the like. The sending unit 701 and the receiving unit 702 may constitute a transceiver.

Figure 8:
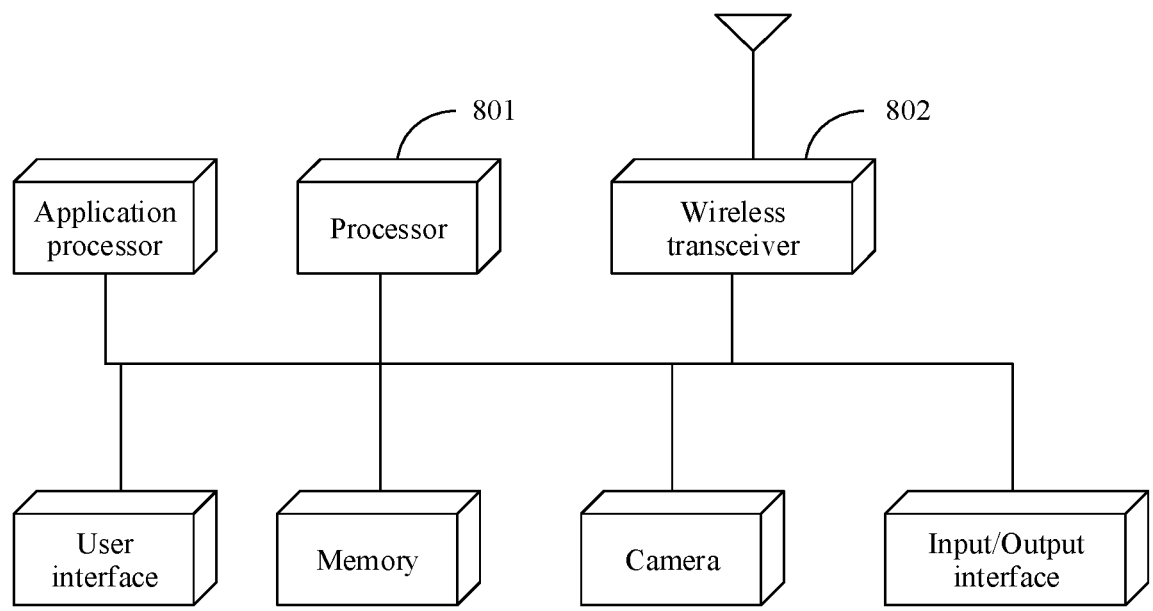
FIG. 8 is a schematic structural diagram of still another user equipment according to an embodiment of this application.

In a possible implementation, for a structure of the user equipment, refer to a device shown in FIG. 8. The device includes a processor 801, an application processor, a wireless transceiver 802, a memory, a user interface, and some other elements (including a device such as a power supply that is not shown). The processor in the user equipment may be the processor 801 in FIG. 8, and implements a corresponding function. The transceiver in the user equipment may be the wireless transceiver 802 in the figure, and implements a corresponding function through an antenna. It may be understood that the elements shown in the figure are merely an example, and are not mandatory elements for implementing the embodiments.

Figure 9:
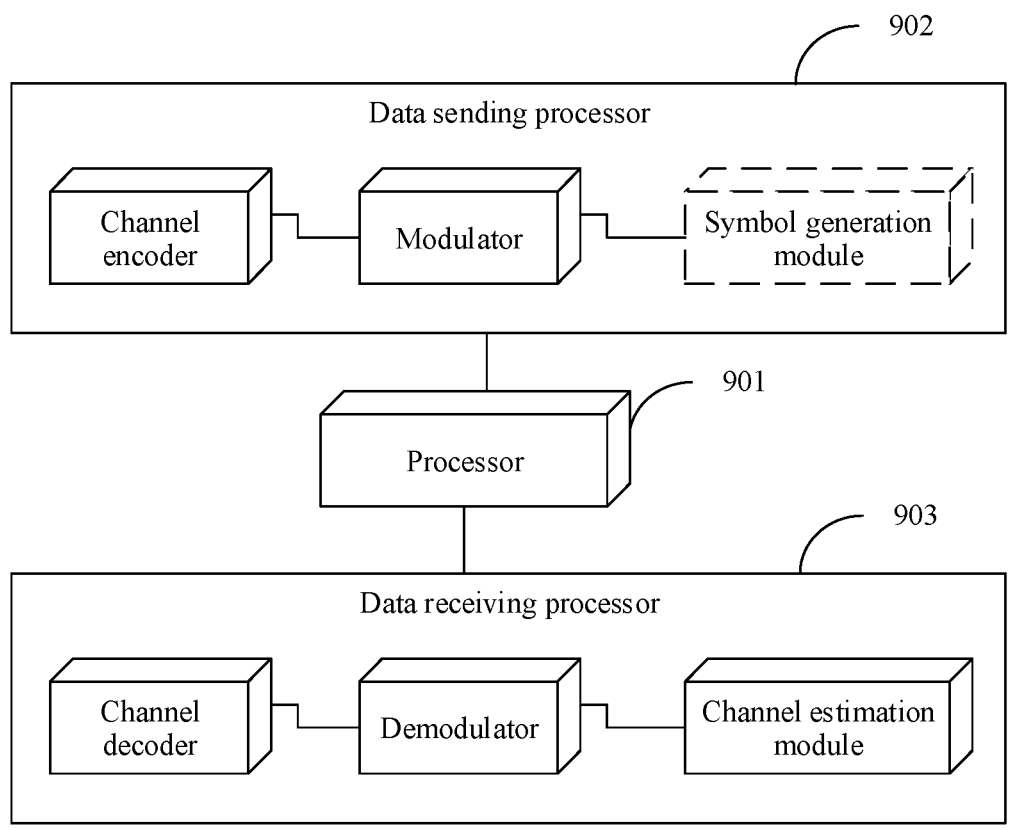
FIG. 9 is a schematic structural diagram of still another user equipment according to an embodiment of this application.

In addition, for a structure of the user equipment, refer to a device shown in FIG. 9. For example, the device may implement a function similar to that of the processor 801 in FIG. 8. In FIG. 9, the device includes a processor 901, a data sending processor 902, and a data receiving processor 903. In FIG. 9, the transceiver may be the data sending processor 902 and/or the data receiving processor 903; and the processor or the processing unit may be the processor 901, and implements a corresponding function. The sending unit may be the data sending processor 902 in FIG. 9, and the receiving unit may be the data receiving processor 903 in FIG. 9. Although a channel encoder and a channel decoder are shown in the figure, it may be understood that the modules are merely an example, and do not constitute a limitation on this embodiment.

Figure 10:
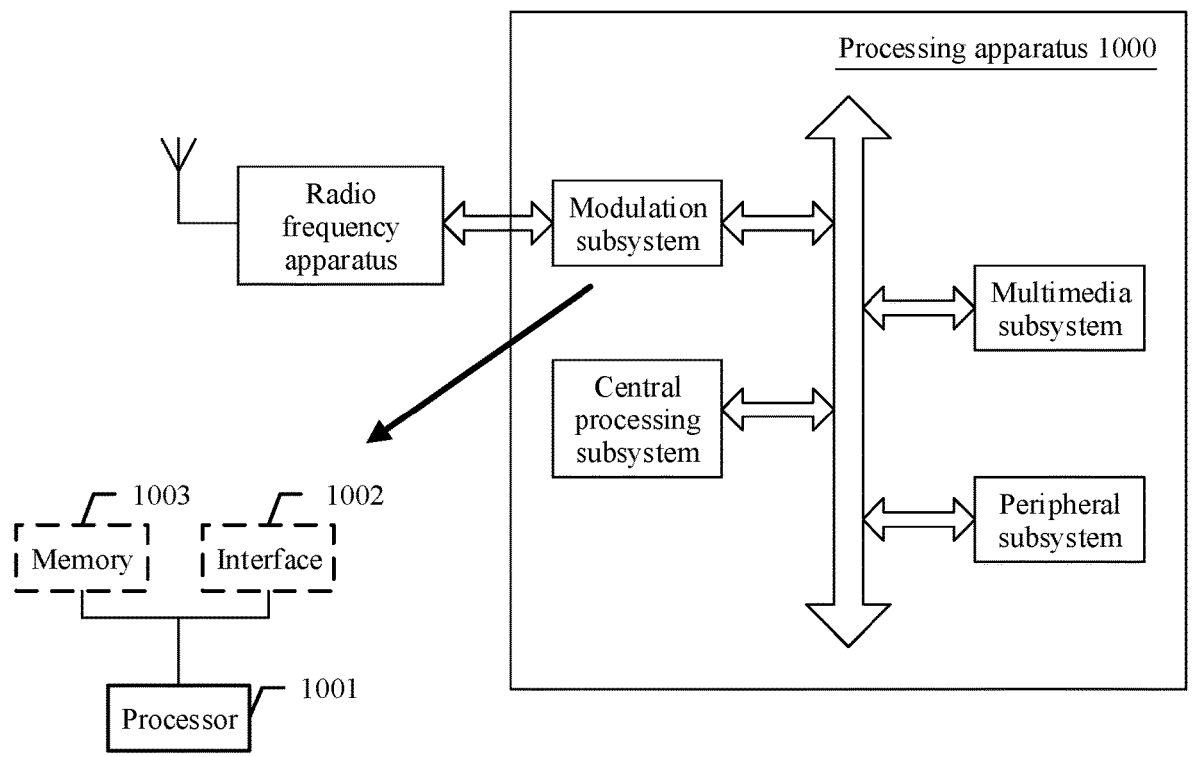
FIG. 10 is a schematic structural diagram of still another user equipment according to an embodiment of this application.

FIG. 10 shows another form of user equipment according to an embodiment. A processing apparatus 1000 includes modules such as a modulation subsystem, a central processing subsystem, and a peripheral subsystem. The user equipment in this embodiment may be used as the modulation subsystem in the processing apparatus 1000. Specifically, the modulation subsystem may include a processor 1001 and an interface 1002. The processor 1001 implements a function of the processing unit, and the interface 1002 implements a function of the transceiver. As another variant, the modulation subsystem includes a memory 1003, a processor 1001, and a program that is stored in the memory 1003 and that can be run by the processor 1001. When executing the program, the processor 1001 implements the method in the embodiments. It should be noted that the memory 1003 may be nonvolatile or volatile. The memory 1003 may be located in the modulation subsystem, or may be located in the processing apparatus 1000, as long as the memory 1003 can be connected to the processor 1001.

Based on a same concept as that in the foregoing method embodiments, an embodiment of this application further provides a computer-readable storage medium. The computer-readable storage medium stores some instructions. When these instructions are invoked and executed, a terminal is enabled to perform a function in any one of the foregoing method embodiments or the possible designs of the foregoing method embodiments. The computer-readable storage medium is not limited in the embodiments of this application. For example, the computer-readable storage medium may be a RAM (random access memory) or a ROM (read-only memory).

Based on a same concept as that in the foregoing method embodiments, an embodiment of this application further provides a computer-readable storage medium. The computer-readable storage medium stores some instructions. When these instructions are invoked and executed, an authentication server is enabled to perform a function in any one of the foregoing method embodiments or the possible designs of the foregoing method embodiments. The readable storage medium is not limited in the embodiments of this application. For example, the readable storage medium may be a RAM or a ROM.

Based on a same concept as that in the foregoing method embodiments, an embodiment of this application further provides a computer program product. When the computer program product runs on a computer, a terminal is enabled to perform a function in any one of the foregoing method embodiments or the possible designs of the foregoing method embodiments.

Based on a same concept as that in the foregoing method embodiments, an embodiment of this application further provides a computer program product. When the computer program product runs on a computer, an authentication server is enabled to perform a function in any one of the foregoing method embodiments or the possible designs of the foregoing method embodiments.

In addition, an embodiment of this application further provides a method for controlling DRX active time.

The communications system 100 shown in FIG. 1 is still used as an example. When the UE 102 operates in a DRX mode, the UE 102 may receive a DRX command from the network side device 101 in a slot, where the DRX command is used to instruct the UE 102 to enter a sleep mode. However, a time period from the slot in which the network side device 101 sends the DRX command to a slot in which the network side device 101 determines that the UE 102 successfully receives the DRX command is a DRX fuzzy period. To be specific, in the fuzzy period, neither the network side device 101 nor the UE 102 can exactly determine whether the UE 102 should be in an active state or in a sleep mode. According to a method for determining a DRX fuzzy period provided in an embodiment of this application, the network side device 101 and the UE 102 can accurately determine the DRX fuzzy period, so as to determine whether the UE 102 enters a sleep mode.

New cross-slot scheduling and a related hybrid automatic repeat request acknowledgement (HARQ-ACK) mechanism are introduced to a new radio (NR) system. The DRX fuzzy period may be determined in the following manner: The DRX fuzzy period includes some or all of the following: a delay of processing a PDCCH and a cross-slot scheduling slot K0, a delay of processing a physical downlink shared channel (PDSCH) scheduled on the PDCCH and used for transmitting a DRX command, and a delay k of processing corresponding HARQ-ACK feedback. Optionally, the DRX fuzzy period may include one additional slot.

K0 may be configured by the network side device 101 for the UE 102 by using dedicated signaling, and k may be obtained from PDCCH scheduling information sent by the network side device 101. A reason for calculating one additional slot is as follows: One additional slot needs to be calculated for the UE 102 to perform HARQ-ACK feedback. Because a HARQ-ACK feedback has not been successfully sent to the network side device 101 in the slot, the network side device 101 still cannot determine whether the UE 102 is definitely in an active state or an inactive state in the slot. To reduce complexity caused by blind detection on transmission of channel state information (CSI) feedback information and a sounding reference signal (SRS) because the network side device 101 cannot determine whether the UE 102 is in an active state or an inactive state, one additional slot is relaxed. To be specific, in a next slot of the slot in which the UE sends the HARQ-ACK, the network side device 101 can definitely determine whether the UE 102 is in an active state or an inactive state.

Figure 11:
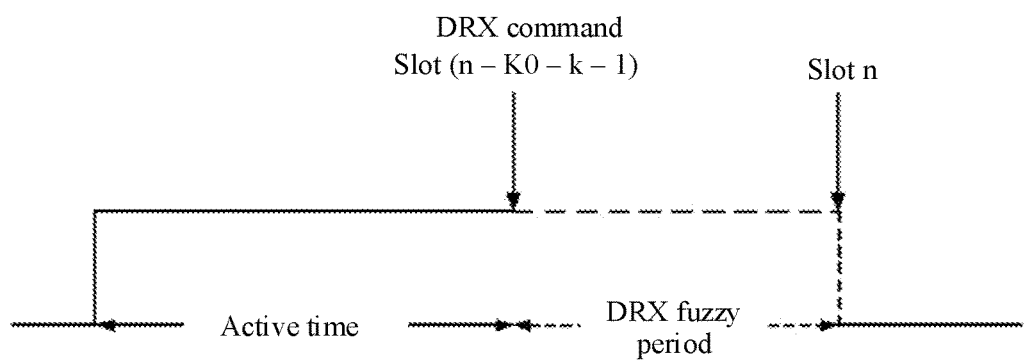
FIG. 11 is a schematic diagram of a DRX fuzzy period according to an embodiment of this application.

Based on this, the DRX fuzzy period may be determined as $(n-K0-k-1)$ slots. For example, as shown in FIG. 11, if the network side device 101 sends a DRX command in a slot $(n-K0-k-1)$, a DRX fuzzy period is from the slot $(n-K0-k-1)$ to a slot n. In the slot n, the UE 102 determines, based on the DRX command sent by the network side device 101 in the slot $(n-K0-k-1)$ and transmission of other scheduling information, whether the UE 102 is in an active state or a sleep mode and whether CSI or an SRS needs to be sent. Other scheduling information includes downlink resource allocation information indicated by a PDCCH, UL resource allocation information, scheduling request information sent by the UE, and the like.

To facilitate implementation performed by the UE 102, the DRX fuzzy period may be determined based on some or all of the following: $n-K0-k$, $n-k-1$, $n-k$, $n-K0\_max-k\_max-1$, $n-K0\_max-k\_max$, $n-k\_max-1$, or $n-k\_max$, where $K0\_max$ represents a maximum value that can be obtained for K0 in the NR system, and $k\_max$ represents a maximum value that can be obtained for k in the NR system. Based on the DRX fuzzy period, the UE 102 can determine whether the UE 102 is in DRX inactive time. For example, after receiving PDCCH scheduling information for a DRX control command in a second slot, the UE 102 may determine that a MAC entity of the user equipment is in the DRX inactive time in a first slot. A slot offset from the second slot to the first slot is the DRX fuzzy period.

Optionally, the UE 102 may or may not perform CSI and/or SRS transmission from a slot $n-(K0+k+1)$ to the slot n or from a slot $n-(K0+k)$ to the slot n.

In addition, if the UE 102 currently has a plurality of active BWPs, and the plurality of BWPs have different slot lengths, how to determine a fuzzy period length is also a problem to be resolved.

In implementation, the UE 102 may determine the fuzzy period length based on $(n-K0-k-1)$ and a slot length that corresponds to a BWP for receiving the DRX command.

Alternatively, the UE 102 may determine the DRX fuzzy period length through calculation based on $(n-K0-k-1)$ and a maximum slot length that corresponds to a BWP in the plurality of BWPs that are currently active.

Based on the foregoing method for determining a DRX fuzzy period, a method for controlling DRX active time provided in an embodiment of this application includes:

determining, by user equipment, that a MAC entity of the user equipment is in DRX inactive time in a first slot; and determining, by the user equipment, not to perform SRS transmission and/or CSI transmission; where the determining, by user equipment, that a MAC entity of the user equipment is in DRX inactive time in a first slot includes:

receiving, by the user equipment, PDCCH scheduling information for a DRX control command in a second slot, where the DRX control command is used to instruct the user equipment to enter the DRX inactive time, the second slot is obtained by subtracting a slot offset from the first slot, and the slot offset is equal to any one of the following:

K0+k;
K0+k+1;
k+1;
k;
$n-K0\_max-k\_max-1$;
$n-K0\_max-k\_max$;
$n-k\_max-1$; or
$n-k\_max$;

where K0 represents an interval between a moment for receiving the PDCCH scheduling information in the second slot and a moment for scheduling a PDSCH resource based on the PDCCH scheduling information, k represents an interval between a slot in which the user equipment receives the PDSCH and a slot in which the user equipment performs HARQ feedback, $K0\_max$ represents a maximum value of K0, and $k\_max$ represents a maximum value of k.

Optionally, the method further includes:

receiving, by the user equipment, a first message, where the first message includes a value of K0.

Optionally, the method further includes:

receiving, by the user equipment, a second message, where the second message includes a value of k.

Optionally, the method further includes:

determining, by the user equipment, a slot length corresponding to a first BWP for receiving the DRX control command, and determining, based on the slot length, slot lengths corresponding to n, K0, and k; or determining, by the user equipment, a maximum slot length corresponding to a second BWP in a plurality of BWPs that are active currently, and determining, based on the determined slot length, slot lengths corresponding to n, K0, and k.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (or system), and the computer program product in the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to operate in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the following claims are intended to be construed as to cover the embodiments of this application and all changes and modifications falling within the scope of this application.

It is clear that persons skilled in the art can make various modifications and variations to this application without departing from the spirit and scope of this application. This application is intended to cover these modifications and variations of this application provided that the modifications and variations fall within the scope of protection defined by the following claims and equivalent technologies of the claims.

What is claimed is:

1. A method, comprising:
activating a first bandwidth part in response to a first message in a case of switching from a second bandwidth part to the first bandwidth part, wherein the second bandwidth part is a bandwidth part that has been activated before a user equipment activates the first bandwidth part, wherein timing of a target timer is based on a unit time length of the second bandwidth part when the second bandwidth is activated;
in response to the first bandwidth part being activated, controlling the target timer to perform timing continuously based on the unit time length of the second bandwidth part until the target timer is stopped or the target timer expires, wherein the unit time length of the second bandwidth part is a slot length or a symbol length of the second bandwidth part; and
after the target timer is stopped or expires, controlling the target timer to perform timing based on a unit time length of the first bandwidth part, wherein:
the unit time length of the first bandwidth part is a slot length or a symbol length of the first bandwidth part, the target timer comprises a discontinuous reception (DRX)-retransmission timer or a DRX hybrid automatic repeat request-round-trip time (DRX HARQ RTT) timer, wherein, the unit time length of the first bandwidth part is greater than the unit time length of the second bandwidth part or the unit time length of the first bandwidth part is less than the unit time length of the second bandwidth part.

2. The method according to claim 1, further comprises:
determining a second count value of the target timer based on a first count value of the target timer and an adjustment multiple ratio, wherein the adjustment multiple ratio is determined based on the unit time length of the first bandwidth part and the unit time length of the second bandwidth part.

3. The method according to claim 1, wherein a third count value indicates a remaining time duration of the target timer that exists when the first bandwidth part is activated, and the remaining time duration is used to indicate a quantity of remaining slots or a quantity of remaining symbols that are used by the target timer to perform timing based on the unit time length of the second bandwidth part before the target timer expires.

4. The method according to claim 1, wherein
the first message is a physical downlink control channel (PDCCH) signaling, a media access control control element (MAC CE), or a radio resource control (RRC) message.

5. The method according to claim 1, wherein the slot length or the symbol length of the first bandwidth part is determined based on a subcarrier spacing of the first bandwidth part, and the slot length or the symbol length of the second bandwidth part is determined based on a subcarrier spacing of the second bandwidth part.

6. An apparatus, comprising a memory, and at least one processor, wherein:
the memory is configured to store instructions; and
the processor is configured to invoke the instructions in the memory to perform operations comprising:
activating a first bandwidth part in response to a first message in a case of switching from a second bandwidth part to the first bandwidth part, wherein the second bandwidth part is a bandwidth part that has been activated before the first bandwidth part is activated, wherein timing of a target timer is based on a unit time length of the second bandwidth part when the second bandwidth is activated;
in response to the first bandwidth part being activated, controlling the target timer to perform timing continuously based on the unit time length of the second bandwidth part until the target timer is stopped or the target timer expires, wherein the unit time length of the second bandwidth part is a slot length or a symbol length of the second bandwidth part;
after the target timer is stopped or expires, controlling the target timer to perform timing based on a unit time length of the first bandwidth part, wherein:
the unit time length of the first bandwidth part is a slot length or a symbol length of the first bandwidth part, the target timer comprises a discontinuous reception (DRX)-retransmission timer or a DRX hybrid automatic repeat request-round-trip time (DRX HARQ RTT) timer, wherein, the unit time length of the first bandwidth part is greater than the unit time length of the second bandwidth part or the unit time length of the first bandwidth part is less than the unit time length of the second bandwidth part.

7. The apparatus according to claim 6, wherein the processor is further configured to perform operations comprising:

determining a second count value of the target timer based on a first count value of the target timer and an adjustment multiple ratio, wherein the adjustment multiple ratio is determined based on the unit time length of the first bandwidth part and the unit time length of the second bandwidth part.

8. The apparatus according to claim 6, wherein a third count value indicates a remaining time duration of the target timer that exists when the first bandwidth part is activated, and the remaining time duration is used to indicate a quantity of remaining slots or a quantity of remaining symbols that are used by the target timer to perform timing based on the unit time length of the second bandwidth part before the target timer expires.

9. The apparatus according to claim 6, wherein
the first message is a physical downlink control channel (PDCCH) signaling, a media access control control element (MAC CE), or a radio resource control (RRC) message.

10. The apparatus according to claim 6, wherein the slot length or the symbol length of the first bandwidth part is determined based on a subcarrier spacing of the first bandwidth part, and the slot length or the symbol length of the second bandwidth part is determined based on a subcarrier spacing of the second bandwidth part.

11. A non-transitory computer-readable storage medium having processor-executable instructions stored thereon, wherein the processor-executable instructions, when executed by a processor, configure the processor for:

activating a first bandwidth part in response to a first message in a case of switching from a second bandwidth part to the first bandwidth part; wherein the second bandwidth part is a bandwidth part that has been activated before the first bandwidth part is activated, wherein timing of a target timer is based on a unit time length of the second bandwidth part when the second bandwidth is activated;

in response to the first bandwidth part being activated, controlling the target timer to perform timing continuously based on the unit time length of the second bandwidth part until the target timer is stopped or the target timer expires, wherein the unit time length of the second bandwidth part is a slot length or a symbol length of the second bandwidth part; and after the target timer is stopped or expires, controlling the target timer to perform timing based on a unit time length of the first bandwidth part, wherein:

the unit time length of the first bandwidth part is a slot length or a symbol length of the first bandwidth part, the target timer comprises a discontinuous reception (DRX)-retransmission timer or a DRX hybrid automatic repeat request-round-trip time (DRX HARQ RTT) timer, wherein, the unit time length of the first bandwidth part is greater than the unit time length of the second bandwidth part or the unit time length of the first bandwidth part is less than the unit time length of the second bandwidth part.

12. The non-transitory computer-readable storage medium according to claim 11, wherein the processor-executable instructions, when executed, further facilitate:

determining a second count value of the target timer based on a first count value of the target timer and an adjustment multiple ratio, wherein the adjustment multiple ratio is determined based on the unit time length of the first bandwidth part and the unit time length of the second bandwidth part.

13. The non-transitory computer-readable storage medium according to claim 11, wherein a third count value indicates a remaining time duration of the target timer that exists when the first bandwidth part is activated, and the remaining time duration is used to indicate a quantity of remaining slots or a quantity of remaining symbols that are used by the target timer to perform timing based on the unit time length of the second bandwidth part before the target timer expires.

14. The non-transitory computer-readable storage medium according to claim 11, wherein the first message is a physical downlink control channel (PDCCH) signaling, a media access control control element (MAC CE), or a radio resource control (RRC) message.

15. The non-transitory computer-readable storage medium according to claim 11, wherein the slot length or the symbol length of the first bandwidth part is determined based on a subcarrier spacing of the first bandwidth part, and the slot length or the symbol length of the second bandwidth part is determined based on a subcarrier spacing of the second bandwidth part.

* * * * *